US012770109B2

(12) United States Patent
D'souza et al.

(10) Patent No.: US 12,770,109 B2
(45) Date of Patent: Oct. 20, 2026

(54) INDUSTRIAL INTERNET-OF-THINGS ASSET MANAGEMENT SYSTEM

(71) Applicant: Honeywell International Inc., Charlotte, NC (US)

(72) Inventors: Aaron D'souza, Atlanta, GA (US); Vidya Shivamurthy, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 692 days.

(21) Appl. No.: 18/325,558

(22) Filed: May 30, 2023

(65) Prior Publication Data

US 2024/0403743 A1 Dec. 5, 2024

(51) Int. Cl.
*G06Q 10/20* (2023.01)

(52) U.S. Cl.
CPC .................................... *G06Q 10/20* (2013.01)

(58) Field of Classification Search
CPC ...................................................... G06Q 10/20
USPC ............................................................ 706/45
See application file for complete search history.

(56) References Cited

U.S. PATENT DOCUMENTS

| | | | | |
|---|---|---|---|---|
| 8,719,276 | B1 * | 5/2014 | Haahr | G06F 16/951 707/723 |
| 2006/0136098 | A1 * | 6/2006 | Chitrapura | G06F 16/951 700/262 |
| 2014/0362737 | A1 * | 12/2014 | Beshai | H04L 45/54 370/255 |
| 2016/0248794 | A1 * | 8/2016 | Cam | H04L 63/1433 |
| 2018/0060832 | A1 * | 3/2018 | Korsedal, IV | G01M 99/005 |
| 2022/0121965 | A1 | 4/2022 | Chatterji et al. | |
| 2023/0153646 | A1 * | 5/2023 | Ploennigs | G06N 5/022 706/48 |

* cited by examiner

*Primary Examiner* — Muluemebet Gurmu
(74) *Attorney, Agent, or Firm* — Alston & Bird LLP

(57) ABSTRACT

A system for monitoring a plurality of assets associated with a plurality of spaces may be configured to generate a knowledge graph comprising a plurality of nodes, each node of the plurality of nodes being associated with (i) a respective asset of the plurality of assets or (ii) a respective space of the plurality of spaces; determine a respective initial ranking value for each node of the plurality of nodes; determine a count of outgoing links for each node of the plurality of nodes; perform a node ranking based on the initial ranking values and based on the counts of outgoing links to determine a respective updated ranking value for each node of the plurality of nodes; and determine a respective criticality measure for each node of the plurality of nodes based on the respective updated ranking value.

20 Claims, 11 Drawing Sheets

INDUSTRIAL INTERNET-OF-THINGS ASSET MANAGEMENT SYSTEM

TECHNICAL FIELD

This disclosure describes techniques related to utilizing an extensible object model for managing assets of an enterprise.

BACKGROUND

Organizations such as businesses, governments, and other such entities often own significant numbers of physical and non-physical assets. Proper maintenance and management of those assets can be critical to the operations of the organization.

SUMMARY

IoT platforms for monitoring industrial IoT environments often utilize indicators of criticality in their management decision making processes. The criticality of assets is typically determined at the time an asset is added to the IoT environment or at the time the IoT platform is set up. To further improve the criticality rankings established by IoT platforms, the present disclosure describes techniques for configuring an IoT platform to update an initial ranking of criticality based on a centrality algorithm to determine the influence one asset may have on other assets. As will be explained in more detail below, an IoT platform of the present disclosure may be configured to modify the initial ranking based on a determination of how many outgoing links each asset has. Thus, in addition to traditional factors such as cost, an IoT platform of the present disclosure may also determine criticality based on the influence of one asset on other assets. Moreover, such a measure of criticality may be determined automatically and objectively rather than just based on subjective user inputs.

By updating an initial ranking of criticality based on a number of outgoing links for an asset, an IoT platform of the present disclosure may produce better criticality rankings compared to existing IoT platforms. Moreover, by updating an initial ranking of criticality based on a number of outgoing links for an asset, an IoT platform of the present disclosure is less reliant on the input entered at the time of initial setup, thus potentially enabling the initial setup of the IoT platform to be done more quickly and with fewer initial user inputs needed.

According to one example of the present disclosure, a system for monitoring a plurality of assets associated with a plurality of spaces includes a memory and one or more processors coupled to the memory, implemented in circuitry, and configured to: generate a knowledge graph comprising a plurality of nodes, each node of the plurality of nodes being associated with (i) a respective asset of the plurality of assets or (ii) a respective space of the plurality of spaces; determine a respective initial ranking value for each node of the plurality of nodes; determine a count of outgoing links for each node of the plurality of nodes; perform a node ranking based on the initial ranking values and based on the counts of outgoing links to determine a respective updated ranking value for each node of the plurality of nodes; determine a respective criticality measure for each node of the plurality of nodes based on the respective updated ranking value; compare the respective criticality measure with a predetermined criticality threshold; and generate, in response to determining that the respective criticality measure is greater than the predetermined criticality threshold, a signal indicative of the respective asset associated with the respective criticality measure.

According to another example of the present disclosure, a method for ranking a plurality of assets associated with a plurality of spaces includes generating, by processing circuitry, a knowledge graph comprising a plurality of nodes, each node of the plurality of nodes being associated with (i) a respective asset of the plurality of assets or (ii) a respective space of the plurality of spaces; determining, by the processing circuitry, a respective initial ranking value for each node of the plurality of nodes; determining, by the processing circuitry, a count of outgoing links for each node of the plurality of nodes; performing, by the processing circuitry, a node ranking based on the initial ranking values and based on the counts of outgoing links to determine a respective updated ranking value for each node of the plurality of nodes; determining, by the processing circuitry, a respective criticality measure for each node of the plurality of nodes based on the respective updated ranking value; comparing, by the processing circuitry, the respective criticality measure with a predetermined criticality threshold; and generating, by the processing circuitry and in response to determining that the respective criticality measure is greater than the predetermined criticality threshold, a signal indicative of the respective asset associated with the respective criticality measure.

The details of one or more examples of the disclosure are set forth in the accompanying drawings and the description below. Other features, objects, and advantages will be apparent from the description, drawings, and claims.

BRIEF DESCRIPTION OF THE DRAWINGS

The accompanying drawings, which are incorporated in and constitute a part of the present disclosure, illustrate various example implementations and together with the description, serve to explain the principles of the disclosed techniques.

DETAILED DESCRIPTION

Figure 1:
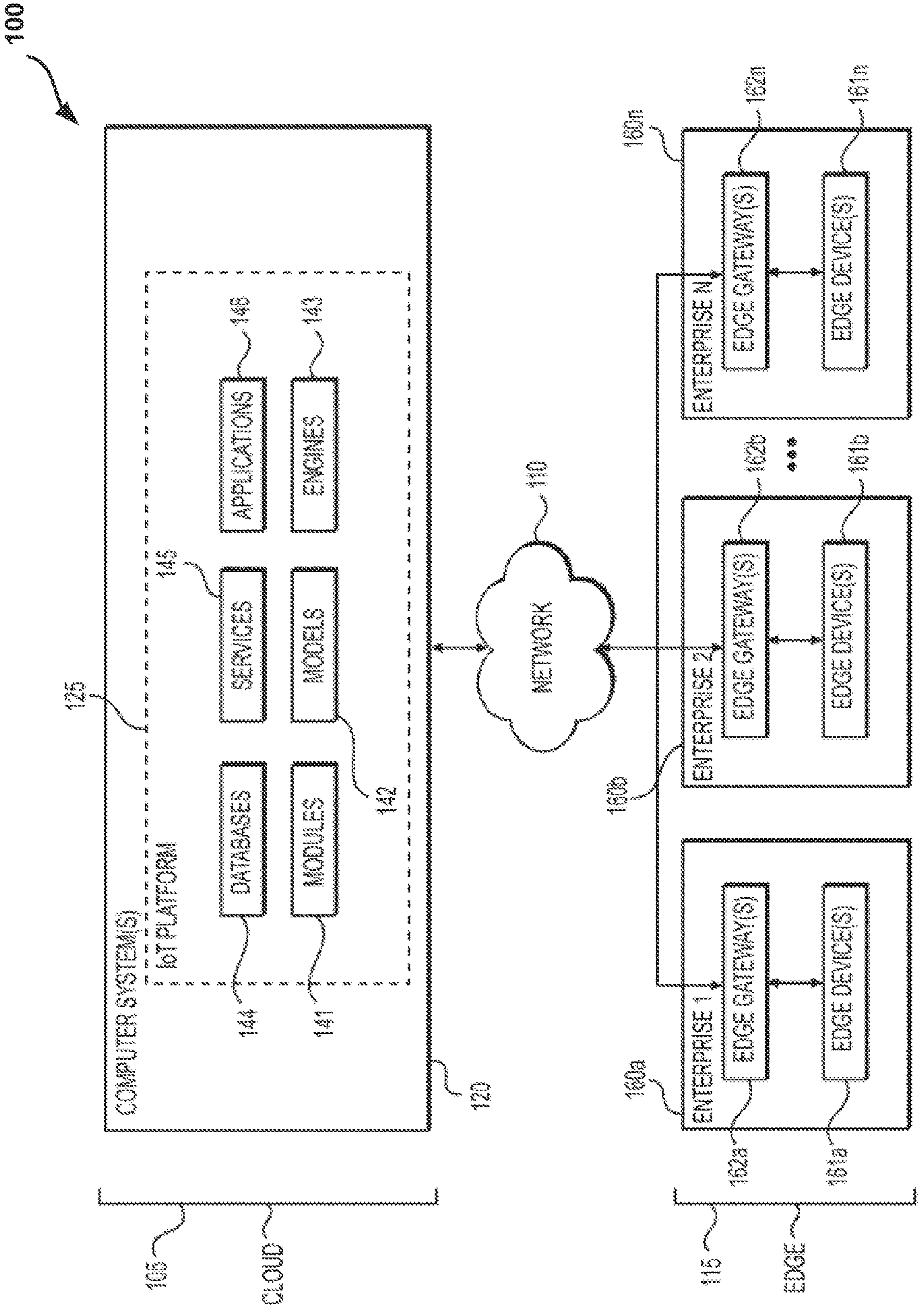
FIG. 1 depicts a networked computing system environment configured to implement techniques of the present disclosure.

In general, the present disclosure provides for an "Internet-of-Things" or "IoT" platform for enterprise performance management that uses real-time accurate models and visual analytics to deliver intelligent actionable recommendations for sustained peak performance of an enterprise or organization. The IoT platform is an extensible platform that is portable for deployment in any cloud or data center environment for providing an enterprise-wide, top-to-bottom view, displaying the status of processes, nodes, people, and safety. Further, the IoT platform of the present disclosure supports end-to-end capability to execute digital twins against process data and to translate the output into actionable insights, as detailed in the following description.

The IoT platform may include a number of layers including, for example, an extensible object model (EOM) that includes one or more knowledge graphs. The EOM may be a collection of application programming interfaces (APIs) that enables a seeded semantic object model to be extended. The EOM further enables a customer's knowledge graph to be built subject to the constraints expressed in the customer's semantic object model. Knowledge graphs describe real world entities and their interrelations, organized in graphs. For example, a knowledge graph may define possible classes and relations of entities in a schema and enable the interrelating of potentially arbitrary entities, while covering various topical domains. Thus, knowledge graphs may represent large networks of entities, their semantic types, properties, and relationships between entities. The entities may be physical entities or non-physical entities, such as data.

Entities represent examples of assets that a user of an IoT platform, such as an organization, may own. In a large IoT environment, such as a manufacturing facility or a commercial building, a user may own numerous assets, including physical objects that have monetary value and that must be maintained and operated. A security camera, for example, is one of the many types of assets that may be included in a commercial building. More complicated environments, like manufacturing facilities, potentially have more total assets and a wider variety of asset types. Certain assets may be more critical than other assets. For example, certain assets, relative to others, may have (i) a greater bearing on the functioning of a customer's business, (ii) a greater bearing on safety, (iii) greater costs to repair or replace, (iv) greater costs associated with being offline, or have other characteristics that make those certain assets more critical.

IoT platforms for monitoring industrial IoT environments often utilize indicators of criticality in their management decision making processes. For example, relative to less critical assets, an IoT platform may prioritize maintenance scheduling of more critical assets, maintain larger inventories of replacement parts for more critical assets, perform preemptive replacement rather than replacement at the time of failure for more critical assets, and so on. IoT platforms may also present notifications related to critical assets differently than for non-critical assets. For example, notifications related to assets having a relatively higher criticality may be accorded a higher priority or higher alert status.

The criticality of assets is typically determined at the time an asset is added to the IoT environment or at the time the IoT platform is set up. The criticality is often established based on user input indicative of factors such as an expected life expectancy for an asset, a cost to replace an asset, a cost to repair an asset, an amount of danger associated with asset failure, and other suitable factors. While some information, such as the cost of an asset, can be obtained relatively objectively and accurately, other factors related to criticality may not be easily discernable to a user of an IoT platform. For example, in a complicated IoT environment, such as a petrochemical plant with thousands of interrelated assets, the downstream effect that one asset has on another asset is not always obvious or easily discernible. As another example, an asset having a relatively low cost may critically affect the performance of another asset having a relatively higher cost, but may be disregarded by a user who is unaware of the impact of the low-cost asset. Thus, rankings of asset criticality based solely on user inputs may ignore factors that can significantly contribute to the criticality of an asset. Moreover, ranking assets based on such user inputs also requires significant up-front costs and can be time consuming.

To further improve the criticality rankings established by IoT platforms, the present disclosure describes techniques for configuring an IoT platform to update an initial ranking of criticality based on a centrality algorithm to determine the influence one asset may have on other assets. As will be explained in more detail below, an IoT platform of the present disclosure may be configured to modify the initial ranking based on a determination of how many outgoing links each asset has. Thus, in addition to traditional factors such as cost, an IoT platform of the present disclosure may also determine criticality based on the influence of one asset on other assets. Moreover, such a measure of criticality may be determined automatically and objectively rather than just based on subjective user inputs.

In examples, a technique for ranking a plurality of assets associated with a plurality of spaces, may include generating, by processing circuitry, a knowledge graph. The knowledge graph includes a plurality of nodes. Each node of the plurality of nodes is associated with (i) a respective asset of the plurality of assets or (ii) a respective space of the plurality of spaces. The technique may further include determining, by the processing circuitry, a respective initial ranking value for each node of the plurality of nodes. The technique may further include determining, by the processing circuitry, a count of outgoing links for each node of the plurality of nodes. The technique may further include performing, by the processing circuitry, a node ranking based on the initial ranking values and based on the counts of outgoing links to determine a respective updated ranking value for each node of the plurality of nodes. The technique may further include determining, by the processing circuitry, a respective criticality measure for each node of the plurality of nodes based on the respective updated ranking value. The technique may further include comparing, by the processing circuitry, the respective criticality measure with a predetermined criticality threshold. The technique may further include generating, by the processing circuitry and in response to determining that the respective criticality measure is greater than the predetermined criticality threshold, a signal indicative of the respective asset associated with the respective criticality measure.

By updating an initial ranking of criticality based on a number of outgoing links for an asset, an IoT platform of the present disclosure may produce better criticality rankings compared to existing IoT platforms. Moreover, by updating an initial ranking of criticality based on a number of outgoing links for an asset, an IoT platform of the present disclosure is less reliant on the input entered at the time of initial setup, thus potentially enabling the initial setup of the IoT platform to be done more quickly and with fewer initial user inputs needed.

FIG. 1 illustrates an example of a networked computing system environment 100 that may be configured to implement criticality rankings based on centrality in accordance with the techniques of the present disclosure. The various devices, components, and features of networked computing system environment 100 may be implemented in hardware, software, firmware, or any combination thereof. As shown in FIG. 1, networked computing system environment 100 is organized into a plurality of layers including a cloud layer 105, a network layer 110, and an edge layer 115. As detailed further below, components of the edge layer 115 are in communication with components of the cloud layer 105 via the network layer 110.

The network layer 110 may be any suitable network or combination of networks and may support any appropriate protocol suitable for communication of data to and from components of the cloud layer 105 and between various other components in the networked computing system environment 100 (e.g., components of the edge layer 115). The network layer 110 may include a public network (e.g., the Internet), a private network (e.g., a network within an organization), or a combination of public and/or private networks. The network layer 110 may be configured to provide communication between various components depicted in FIG. 1. The network layer 110 may include one or more networks that connect devices and/or components in the network layout to allow communication between the devices and/or components. For example, the network layer 110 may be implemented as the Internet, a wireless network, a wired network (e.g., Ethernet), a local area network (LAN), a Wide Area Network (WANs), Bluetooth, Near Field Communication (NFC), or any other type of network that provides communications between one or more components of the network layout. In some examples, the network layer 110 may be implemented using cellular networks, satellite, licensed radio, or a combination of cellular, satellite, licensed radio, and/or unlicensed radio networks.

Components of the cloud layer 105 may include one or more computer systems 120 that form a so-called "Internet-of-Things" or "IoT" platform 125. It should be appreciated that "IoT platform" is an optional term describing a platform connecting any type of Internet-connected device and should not be construed as limiting on the types of computing systems useable within the IoT platform 125. In particular, computer systems 120 may include any type or quantity of one or more processors and one or more data storage devices comprising memory for storing and executing applications or software modules of networked computing system environment 100. In one example, the processors and data storage devices are embodied in server-class hardware, such as enterprise-level servers. For example, the processors and data storage devices may include any type or combination of application servers, communication servers, web servers, super-computing servers, database servers, file servers, mail servers, proxy servers, and/virtual servers. Further, the one or more processors are configured to access the memory and execute processor-readable instructions, which when executed by the processors configures the processors to perform a plurality of functions of the networked computing system environment 100.

Computer systems 120 further include one or more software components of the IoT platform 125. For example, the software components of computer systems 120 may include one or more software modules to communicate with user devices and/or other computing devices through network 110. For example, the software components may include one or more modules 141, models 142, engines 143, databases 144, services 145, and/or applications 146, which may be stored in/by the computer systems 120 (e.g., stored on the memory), as detailed with respect to FIG. 2 below. The one or more processors may be configured to utilize the one or more modules 141, models 142, engines 143, databases 144, services 145, and/or applications 146 when performing various processes described in the present disclosure.

Accordingly, computer systems 120 may execute a cloud computing platform (e.g., IoT platform 125) with scalable resources for computation and/or data storage and may run one or more applications on the cloud computing platform to perform various computer-implemented processes described in the present disclosure. In some examples, some of the modules 141, models 142, engines 143, databases 144, services 145, and/or applications 146 may be combined to form fewer modules, models, engines, databases, services, and/or applications. In some examples, some of the modules 141, models 142, engines 143, databases 144, services 145, and/or applications 146 may be separated into separate, more numerous modules, models, engines, databases, services, and/or applications. In some examples, some of the modules 141, models 142, engines 143, databases 144, services 145, and/or applications 146 may be removed while others may be added.

The computer systems 120 are configured to receive data from other components (e.g., components of the edge layer 115) of networked computing system environment 100 via the network layer 110. Computer systems 120 are further configured to utilize the received data to produce a result. Information indicating the result may be transmitted to users via user computing devices over the network layer 110. In some examples, the computer systems 120 may be referred to as a server system that provides one or more services including providing the information indicating the received data and/or the result(s) to the users. Computer systems 120 are part of an entity, which may include any type of company, organization, or institution that implements one or more IoT services. In some examples, the entity may be an IoT platform provider.

Components of the edge layer 115 include one or more enterprises **160*a* to 160*n*, each including one or more edge devices 161*a* to 161*n* and one or more edge gateways 162*a* to 162*n*. For example, a first enterprise 160*a* includes first edge devices 161*a* and first edge gateways 162*a*, a second enterprise 160*b* includes second edge devices 161*b* and second edge gateways 162*b*, and an nth enterprise 160*n* includes nth edge devices 161*n* and nth edge gateways 162*n*. As used herein, enterprises 160*a* to 160*n*** may represent any type of entity, facility, or vehicle, such as, for example, companies, divisions, buildings, manufacturing plants, warehouses, real estate facilities, laboratories, aircraft, spacecraft, automobiles, ships, boats, military vehicles, oil and gas facilities, or any other type of entity, facility, and/or vehicle that includes any number of local devices.

Figure 2:
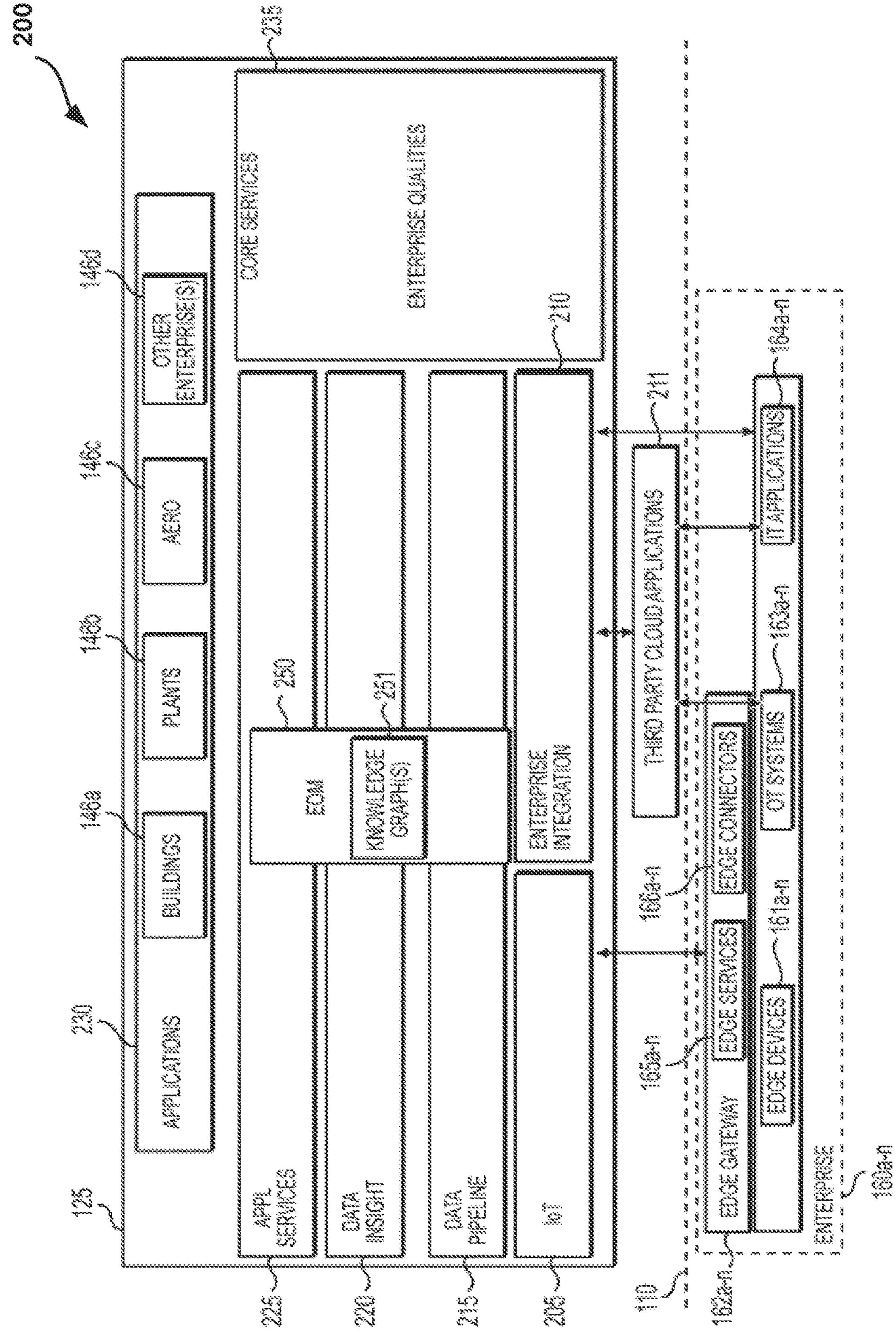
FIG. 2 depicts a schematic block diagram of a framework of an Internet-of-Things (IoT) platform of the networked computing system environment of FIG. 1, with the IoT platform including one or more extensible object models ("EOM").

The edge devices 161*a* to 161*n* may represent any of a variety of different types of devices that may be found within the enterprises 160*a* to 160*n*. Edge devices 161*a* to 161*n* are any type of device configured to access the network layer 110, or be accessed by other devices through the network layer 110, such as via an edge gateway 162*a* to 162*n*. Edge devices 161*a* to 161*n* may be referred to in some cases as "IoT devices," which may therefore include any type of network-connected (e.g., Internet-connected) device. For example, the edge devices 161*a* to 161*n* may include sensors, actuators, processors, computers, valves, pumps, ducts, vehicle components, cameras, displays, doors, windows, security components, HVAC components, factory equipment, and/or any other devices that may be connected to the network 110 for collecting, sending, and/or receiving information. Each edge device 161*a* to 161*n* includes, or is otherwise in communication with, one or more controllers for selectively controlling a respective edge device 161*a* to 161*n* and/or for sending/receiving information between the edge devices 161*a* to 161*n* and the cloud layer 105 via the network layer 110. With reference to FIG. 2, the edge layer 115 may also include operational technology (OT) systems 163*a* to 163*n* and information technology (IT) applications 164*a* to 164*n* of each enterprise 161*a* to 161*n*. The OT systems 163*a* to 163*n* include hardware and software for detecting and/or causing a change, through the direct monitoring and/or control of industrial equipment (e.g., edge devices 161*a* to 161*n*), nodes, processes, and/or events. The IT applications 164*a* to 164*n* includes network, storage, and computing resources for the generation, management, storage, and delivery of data throughout and between organizations.

The edge gateways 162*a* to 162*n* include devices for facilitating communication between the edge devices 161*a* to 161*n* and the cloud 105 via network 110. For example, the edge gateways 162*a* to 162*n* include one or more communication interfaces for communicating with the edge devices 161*a* to 161*n* and for communicating with the cloud layer 105 via the network layer 110. The communication interfaces of the edge gateways 162*a* to 162*n* may include one or more cellular radios, Bluetooth, WiFi, near-field communication radios, Ethernet, or other appropriate communication devices for transmitting and receiving information. Multiple communication interfaces may be included in each gateway 162*a* to 162*n* for providing multiple forms of communication between the edge devices 161*a* to 161*n*, the gateways 162*a* to 162*n*, and the cloud layer 105 via the network layer 110. For example, communication may be achieved with the edge devices 161*a* to 161*n* and/or the network layer 110 through wireless communication (e.g., WiFi, radio communication, etc.) and/or a wired data connection (e.g., a universal serial bus, an onboard diagnostic system, etc.) or other communication modes, such as a local area network (LAN), wide area network (WAN) such as the Internet, a telecommunications network, a data network, or any other type of network.

The edge gateways 162*a* to 162*n* may also include a processor and memory for storing and executing program instructions to facilitate data processing. For example, the edge gateways 162*a* to 162*n* can be configured to receive data from the edge devices 161*a* to 161*n* and process the data prior to sending the data to the cloud layer 105. Accordingly, the edge gateways 162*a* to 162*n* may include one or more software modules or components for providing data processing services and/or other services or processes of the present disclosure. With reference to FIG. 2, each edge gateway 162*a* to 162*n* includes edge services 165*a* to 165*n* and edge connectors 166*a* to 166*n*. The edge services 165*a* to 165*n* may include hardware and software components for processing the data from the edge devices 161*a* to 161*n*. The edge connectors 166*a* to 166*n* may include hardware and software components for facilitating communication between the edge gateway 162*a* to 162*n* and the cloud layer 105 via the network layer 110, as detailed above. In some cases, any of edge devices 161*a* to 161*n*, edge connectors 166*a* to 166*n*, and edge gateways 162*a* to 162*n* may have their functionality combined, omitted, or separated into any combination of devices. In other words, an edge device and its connector and gateway need not necessarily be discrete devices.

FIG. 2 illustrates a schematic block diagram of framework 200 of the IoT platform 125, according to the present disclosure. The IoT platform 125 of the present disclosure is a platform for enterprise performance management that uses real-time accurate models and visual analytics to deliver intelligent actionable recommendations for sustained peak performance of the enterprise 160*a* to 160*n*. The IoT platform 125 is an extensible platform that is portable for deployment in any cloud or data center environment for providing an enterprise-wide, top to bottom view, displaying the status of processes, nodes, people, and safety. Further, the IoT platform 125 supports end-to-end capability to execute digital twins against process data and to translate the output into actionable insights, using the framework 200, detailed further below.

As shown in FIG. 2, the framework 200 of the IoT platform 125 includes a number of layers including, for example, an IoT layer 205, an enterprise integration layer 210, a data pipeline layer 215, a data insight layer 220, an application services layer 225, and an applications layer 230. The IoT platform 125 also includes a core services layer 235 and an extensible object model (EOM) 250 comprising one or more knowledge graphs 251. The layers 205-235 further include various software components that together form each layer 205-235. For example, each layer 205-235 may include one or more of the modules 141, models 142, engines 143, databases 144, services 145, applications 146, or combinations thereof. In some examples, the layers 205-235 may be combined to form fewer layers. In some examples, some of the layers 205-235 may be separated into separate, more numerous layers. In some examples, some of the layers 205-235 may be removed while others may be added.

The IoT platform 125 is a model-driven architecture. Thus, the EOM 250 communicates with each layer 205-230 to contextualize site data of the enterprise 160*a* to 160*n* using an extensible object model (or "node model") and knowledge graphs 251 where the equipment (e.g., edge devices 161*a* to 161*n*) and processes of the enterprise 160*a* to 160*n* are modeled. The knowledge graphs 251 of EOM 250 are configured to store the models in a central location. The knowledge graphs 251 define a collection of nodes and links that describe real-world connections that enable smart systems. As used herein, a knowledge graph 251: (i) describes real-world entities (e.g., edge devices 161*a* to 161*n*) and their interrelations organized in a graphical interface; (ii) defines possible classes and relations of entities in a schema; (iii) enables interrelating arbitrary entities with each other; and (iv) covers various topical domains. In other words, the knowledge graphs 251 define large networks of entities (e.g., edge devices 161*a* to 161*n*), semantic types of the entities, properties of the entities, and relationships between the entities. Thus, the knowledge graphs 251 describe a network of "things" that are relevant to a specific domain or to an enterprise or organization. Knowledge graphs 251 are not limited to abstract concepts and relations, but can also contain instances of objects, such as, for example, documents and datasets. In some examples, the knowledge graphs 251 may include resource description framework (RDF) graphs. As used herein, a "RDF graph" is a graph data model that formally describes the semantics, or meaning, of information. The RDF graph can also represent metadata (e.g., data that describes data). Knowledge graphs 251 can also include a semantic object model. The semantic object model is a subset of a knowledge graph 251 that defines semantics for the knowledge graph 251. For example, the semantic object model defines the schema for the knowledge graph 251.

As used herein, EOM 250 is a collection of application programming interfaces (APIs) that enables seeded semantic object models to be extended. For example, the EOM 250 of the present disclosure enables a customer's knowledge graph 251 to be built subject to constraints expressed in the customer's semantic object model. Thus, the knowledge graphs 251 are generated by customers (e.g., enterprises or organizations) to create models of the edge devices 161*a* to 161*n* of an enterprise 160*a* to 160*n*, and the knowledge graphs 251 are input into the EOM 250 for visualizing the models (e.g., the nodes and links).

The models describe the nodes (e.g., the nodes) of an enterprise (e.g., the edge devices 161*a* to 161*n*) and describe the relationship of the nodes with other components (e.g., the links). The models also describe the schema (e.g., describe what the data is), and therefore the models are self-validating. For example, the model can describe the type of sensors mounted on any given node (e.g., edge device 161*a* to 161*n*) and the type of data that is being sensed by each sensor. A key performance indicator (KPI) framework can be used to bind properties of the nodes in the EOM 250 to inputs of the KPI framework. Accordingly, the IoT platform 125 is an extensible, model-driven end-to-end stack including: two-way model sync and secure data exchange between the edge layer 115 and the cloud layer 105, metadata driven data processing (e.g., rules, calculations, and aggregations), and model driven visualizations and applications. As used herein, "extensible" refers to the ability to extend a data model to include new properties/columns/fields, new classes/tables, and new relations. Thus, the IoT platform 125 is extensible with regards to edge devices 161*a* to 161*n* and the applications 146 that handle those devices 161*a* to 161*n*. For example, when new edge devices 161*a* to 161*n* are added to an enterprise 160*a* to 160*n* system, the new devices 161*a* to 161*n* will automatically appear in the IoT platform 125 so that the corresponding applications 146 can understand and use the data from the new devices 161*a* to 161*n*.

In some cases, node templates are used to facilitate configuration of instances of edge devices 161*a* to 161*n* in the model using common structures. A node template defines the typical properties for the edge devices 161*a* to 161*n* of a given enterprise 160*a* to 160*n* for a certain type of device. For example, a node template of a pump includes modeling the pump having inlet and outlet pressures, speed, flow, etc. The templates may also include hierarchical or derived types of edge devices 161*a* to 161*n* to accommodate variations of a base type of device 161*a* to 161*n*. For example, a reciprocating pump is a specialization of a base pump type and would include additional properties in the template. Instances of the edge device 161*a* to 161*n* in the model are configured to match the actual, physical devices of the enterprise 160*a* to 160*n* using the templates to define expected attributes of the device 161*a* to 161*n*. Each attribute is configured either as a static value or with a reference to a time series tag that provides the value. The knowledge graph 251 can automatically map the tag to the attribute based on naming conventions, parsing, and matching the tag and attribute descriptions and/or by comparing the behavior of the time series data with expected behavior.

The modeling phase includes an onboarding process for syncing the models between the edge layer 115 and the cloud layer 105. For example, the onboarding process can include a simple onboarding process, a complex onboarding process, and/or a standardized rollout process. The simple onboarding process includes the knowledge graph 251 receiving raw model data from the edge layer 115 and running context discovery processes to generate the model. The context discovery processes read the context of the edge naming conventions of the edge devices 161*a* to 161*n* and determine what the naming conventions refer to. For example, the knowledge graph 251 can receive "TMP" during the modeling phase and determine that "TMP" relates to "temperature." The generated models are then published. The complex onboarding process includes the knowledge graph 251 receiving the raw model data, receiving point history data, and receiving site survey data. The knowledge graph 251 can then use these inputs to run the context discovery processes. The generated models can be edited and then the models are published. The standardized rollout process includes manually defining standard models in the cloud layer 105 and pushing the models to the edge layer 115.

The IoT layer 205 includes one or more components for device management, data ingest, and/or command/control of the edge devices 161*a* to 161*n*. The components of the IoT layer 205 enable data to be ingested into, or otherwise received at, the IoT platform 125 from a variety of sources. For example, data can be ingested from the edge devices 161*a* to 161*n* through process historians or laboratory information management systems. The IoT layer 205 is in communication with the edge connectors 165*a* to 165*n* installed on the edge gateways 162*a* to 162*n* through network 110, and the edge connectors 165*a* to 165*n* send the data securely to the IoT layer 205. In some examples, only authorized data is sent to the IoT platform 125, and the IoT platform 125 only accepts data from authorized edge gateways 162*a* to 162*n* and/or edge devices 161*a* to 161*n*. Data may be sent from the edge gateways 162*a* to 162*n* to the IoT platform 125 via direct streaming and/or via batch delivery. Further, after any network or system outage, data transfer will resume once communication is re-established and any data missed during the outage will be backfilled from the source system or from a cache of the IoT platform 125. The IoT layer 205 may also include components for accessing time series, alarms and events, and transactional data via a variety of protocols.

The enterprise integration layer 210 includes one or more components for events/messaging, file upload, and/or REST/OData. The components of the enterprise integration layer 210 enable the IoT platform 125 to communicate with third party cloud applications 211, such as any application(s) operated by an enterprise in relation to its edge devices. For example, the enterprise integration layer 210 connects with enterprise databases, such as guest databases, customer databases, financial databases, patient databases, etc. The enterprise integration layer 210 provides a standard application programming interface (API) to third parties for accessing the IoT platform 125. The enterprise integration layer 210 also enables the IoT platform 125 to communicate with the OT systems 163*a* to 163*n* and IT applications 164*a* to 164*n* of the enterprise 160*a* to 160*n*. Thus, the enterprise integration layer 210 enables the IoT platform 125 to receive data from the third-party applications 211 rather than, or in combination with, receiving the data from the edge devices 161*a* to 161*n* directly.

The data pipeline layer 215 includes one or more components for data cleansing/enriching, data transformation, data calculations/aggregations, and/or API for data streams. Accordingly, the data pipeline layer 215 can pre-process and/or perform initial analytics on the received data. The data pipeline layer 215 executes advanced data cleansing routines including, for example, data correction, mass balance reconciliation, data conditioning, component balancing and simulation to ensure the desired information is used as a basis for further processing. The data pipeline layer 215 also provides advanced and fast computation. For example, cleansed data is run through enterprise-specific digital twins. The enterprise-specific digital twins can include a reliability advisor containing process models to determine the current operation and the fault models to trigger any early detection and determine an appropriate resolution. The digital twins can also include an optimization advisor that integrates real-time economic data with real-time process data, selects the right feed for a process, and determines optimal process conditions and product yields.

The data pipeline layer 215 may also use models and templates to define calculations and analytics, and define how the calculations and analytics relate to the nodes (e.g., the edge devices 161*a* to 161*n*). For example, a pump template can define pump efficiency calculations such that every time a pump is configured, the standard efficiency calculation is automatically executed for the pump. The calculation model defines the various types of calculations, the type of engine that should run the calculations, the input and output parameters, the preprocessing requirement and prerequisites, the schedule, etc. The actual calculation or analytic logic may be defined in the template or it may be referenced. Thus, the calculation model can be used to describe and control the execution of a variety of different process models. Calculation templates can be linked with the node templates such that when a node (e.g., edge device 161*a* to 161*n*) instance is created, any associated calculation instances are also created with their input and output parameters linked to the appropriate attributes of the node (e.g., edge device 161*a* to 161*n*).

The IoT platform 125 can support a variety of different analytics models including, for example, first principles models, empirical models, engineered models, user-defined models, machine learning models, built-in functions, and/or any other types of analytics models. Fault models and predictive maintenance models will now be described by way of example, but any type of models may be applicable.

Fault models are used to compare current and predicted enterprise 160*a* to 160*n* performance to identify issues or opportunities, and the potential causes or drivers of the issues or opportunities. The IoT platform 125 includes rich hierarchical symptom-fault models to identify abnormal conditions and their potential consequences. For example, the IoT platform 125 can drill down from a high-level condition to understand the contributing factors, as well as determining the potential impact a lower-level condition may have. There may be multiple fault models for a given enterprise 160*a* to 160*n* looking at different aspects such as process, equipment, control, and/or operations. Each fault model can identify issues and opportunities in their domain, and can also look at the same core problem from a different perspective. An overall fault model can be layered on top to synthesize the different perspectives from each fault model into an overall assessment of the situation and point to the true root cause.

When a fault or opportunity is identified, the IoT platform 125 can make recommendations about the best corrective actions to take. Initially, the recommendations are based on expert knowledge that has been pre-programmed into the system by process and equipment experts. A recommendation services module presents this information in a consistent way regardless of source, and supports workflows to track, close out, and document the recommendation follow-up. The recommendation follow-up can be used to improve the overall knowledge of the system over time as existing recommendations are validated (or not) or new cause and effect relationships are learned by users and/or analytics.

The models can be used to accurately predict what will occur before it occurs and interpret the status of the installed base. Thus, the IoT platform 125 enables operators to quickly initiate maintenance measures when irregularities occur. The digital twin architecture of the IoT platform 125 can use a variety of modeling techniques. The modeling techniques can include, for example, rigorous models, fault detection and diagnostics (FDD), descriptive models, predictive maintenance, prescriptive maintenance, process optimization, and/or any other modeling technique.

The rigorous models can be converted from process design simulation. In this manner, process design is integrated with feed conditions and production requirement. Process changes and technology improvement provide business opportunities that enable more effective maintenance schedule and deployment of resources in the context of production needs. The fault detection and diagnostics include generalized rule sets that are specified based on industry experience and domain knowledge and can be easily incorporated and used working together with equipment models. The descriptive models identify a problem and then the predictive models can determine possible damage levels and maintenance options. The descriptive models can include models for defining the operating windows for the edge devices 161*a* to 161*n*.

Predictive maintenance includes predictive analytics models developed based on rigorous models and statistic models, such as, for example, principal component analysis (PCA) and partial least square (PLS). Machine learning techniques can be applied to train models for fault prediction. Predictive maintenance can leverage FDD-based processes to continuously monitor individual control and equipment performance. Predictive modeling is then applied to a selected condition indicator that deteriorates in time. Prescriptive maintenance includes determining what is the best maintenance option and when it should be performed based on actual conditions rather than time-based maintenance schedule. Prescriptive analysis can select the right solution based on the company's capital, operational, and/or other requirements. Process optimization is determining optimal conditions via adjusting set-points and schedules. The optimized set-points and schedules can be communicated directly to the underlying controllers, which enables automated closing of the loop from analytics to control.

The data insight layer 220 includes one or more components for time series databases (TDSB), relational/document databases, data lakes, blob, files, images, and videos, and/or an API for data query. When raw data is received at the IoT platform 125, the raw data can be stored as time series tags or events in warm storage (e.g., in a TSDB) to support interactive queries and to cold storage for archive purposes. Data can further be sent to the data lakes for offline analytics development. The data pipeline layer 215 can access the data stored in the databases of the data insight layer 220 to perform analytics, as detailed above.

The application services layer 225 includes one or more components for rules engines, workflow/notifications, KPI framework, BI, machine learning, and/or an API for application services. The application services layer 225 enables building of applications 146*a* to 146*d*. The applications layer 230 includes one or more applications 146*a* to 146*d* of the IoT platform 125. For example, the applications 146*a* to 146*d* can include a buildings application 146*a*, a plants application 146*b*, an aerospace application 146*c*, and other enterprise applications 146*d*. The applications 146 can include general applications 146 for portfolio management, node management, autonomous control, and/or any other custom applications. Portfolio management can include the KPI framework and a flexible user interface (UI) builder. Node management can include node performance and node health. Autonomous control can include energy optimization and predictive maintenance. As detailed above, the general applications 146 can be extensible such that each application 146 can be configurable for the different types of enterprises 160*a* to 160*n* (e.g., buildings application 146*a*, plants application 146*b*, aero application 146*c*, and other enterprise applications 146*d*).

The applications layer 230 also enables visualization of performance of the enterprise 160*a* to 160*n*. For example, dashboards provide a high-level overview with drill downs to support deeper investigations. Recommendation summaries give users prioritized actions to address current or potential issues and opportunities. Data analysis tools support ad hoc data exploration to assist in troubleshooting and process improvement.

The core services layer 235 includes one or more services of the IoT platform 125. The core services 235 can include data visualization, data analytics tools, security, scaling, and monitoring. The core services 235 can also include services for tenant provisioning, single login/common portal, self-service admin, UI library/UI tiles, identity/access/entitlements, logging/monitoring, usage metering, API gateway/developer portal, and the IoT platform 125 streams.

As described above, EOM 250 and knowledge graphs 251 of FIG. 2 may be central to the definition of relationships between devices and nodes of the network. Accordingly, example functions and features of an example EOM consistent with the present disclosure will now be described with reference to FIGS. 3A to 11.

Figure 3A:
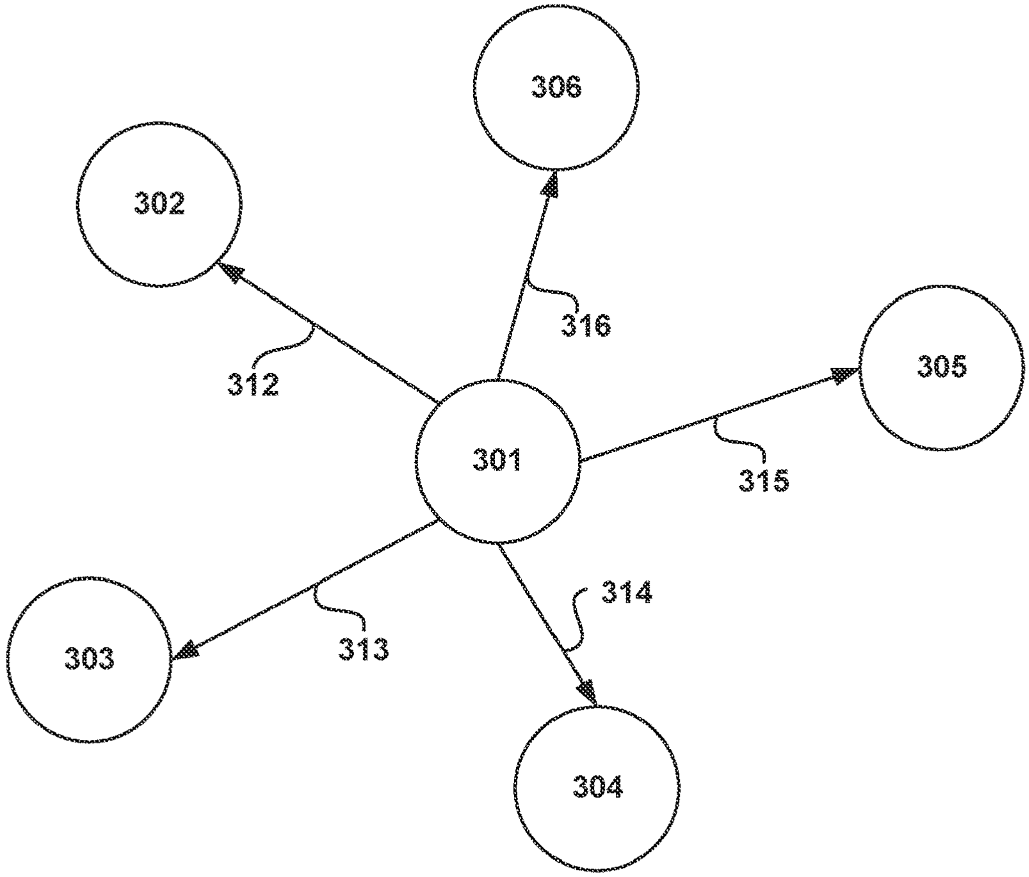
FIG. 3A depicts a schematic diagram of nodes and connectors of an EOM of the type depicted in FIG. 2, according to techniques of the present disclosure.

FIG. 3A depicts an example diagram of nodes and connectors of a knowledge graph 251 of an EOM 250. In the example of FIG. 3A, nodes 301-306 are connected together by links 312-316 (e.g., connectors). Each of the nodes 301-306 may correspond to a node of an enterprise (e.g., the edge devices 161*a* to 161*n*), and each of the links 312-316 may describe a relationship between two or more of the nodes. For example, node 301 may correspond to a first node that is connected to one or more second nodes 302-306. The relationship between the first node and each second node may be defined using connectors (e.g., links 312-316). The nodes may be physical entities and/or non-physical entities. Non-limiting examples of physical entities may be a chiller, an air handling unit (AHU), a fan, dampers, coils, a sensor, a zone control system, a wall module, a return air fan, a multi-axis robot, a conveyor belt, and a cooling/heating coil, etc. Non-limiting examples of virtual or non-physical entities may be data, such as information technology (IT) data, or a virtual machine or its components and modules. Additionally, when a relationship is defined, a probability for each relationship may also be defined (e.g., such that the relationship is a "probabilistic relationship" as opposed to a "deterministic relationship"). Thus, each relationship may have a probability associated with it, where the nature, strength, etc. of the relationship is uncertain and is defined by a probability (i.e., a likelihood) that the defined relationship is true.

Figure 3B:
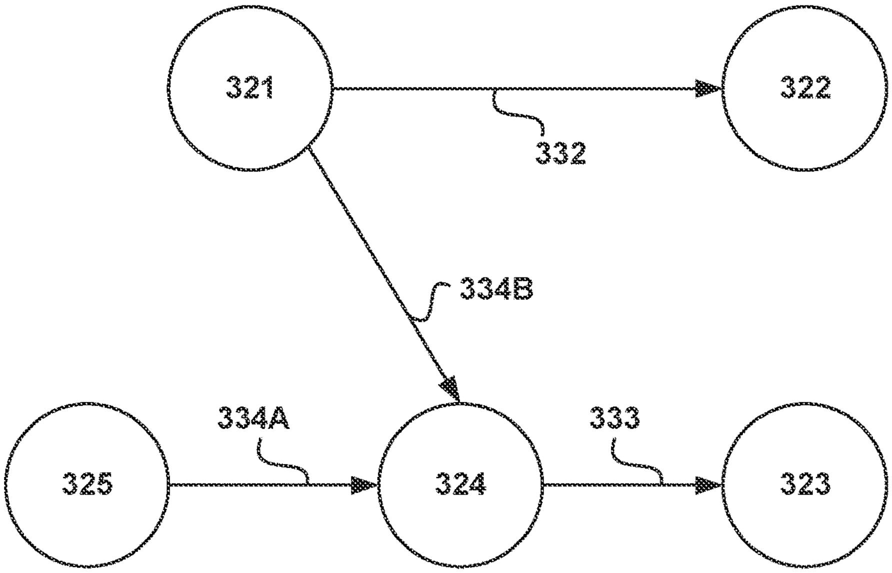
FIG. 3B depicts another schematic diagram of nodes and connectors of an EOM of the type depicted in FIG. 2, according to techniques of the present disclosure.

FIG. 3B depicts an example diagram of nodes and connectors of a knowledge graph 251 of an EOM 250. In the example of FIG. 3B, nodes 321-325 are connected together by links 332-334B (e.g., connectors). As with nodes 301-306, each of nodes 321-325 may correspond to a node of an enterprise (e.g., the edge devices 161*a* to 161*n*), and each of the links 332-334B may describe a relationship between two or more of the nodes. As with nodes 301-306, each relationship may have a probability associated with it. Unlike, nodes 301-306, however, nodes 321-325 have multiple levels of dependencies. Node 332, for example, only depends on node 331, but node 324 depends on both nodes 321 and 325. Node 323 only directly depends on node 324, but as mentioned above, node 324 depends on both nodes 321 and 325. Thus, in the example of FIG. 3B, the functioning of node 321 also affects the functioning of nodes 322, 323, and 324, which means when node 321 is not functioning properly, 80% of all nodes in the example of FIG. 3B are affected. Nodes 322, 323, and 324 may be considered to be downstream from node 321. Conversely, nodes 321 and 325 may be considered to be upstream of nodes 323 and 324. The dependence of nodes 322, 323, and 324 on node 321, is one indicator that node 321 may correspond to a critical asset. As discussed elsewhere, nodes 321-325 may have also other, separate, associated indicators of criticality, besides just dependence on other nodes.

Links 312-316 and 332-334B may be either incoming links or outgoing links depending on their relationship to a particular node. For example, link 312 represents an outgoing link of node 301 and incoming link of node 302. In the example of FIG. 3A, node 301 has five outgoing links (links 312-316), while nodes 302, 303, 304, 305, and 306 each have one incoming link, links 312, 313, 314, 315, and 316, respectively. In the example of FIG. 3B, node 324 has a single outgoing link 333 but has multiple incoming links 334A and 334B.

As will be explained in more detail below, IoT system 125 represents an example of a system that may be used to monitor a plurality of assets associated with a plurality of spaces. IoT platform 125 may, for example, store in knowledge graphs 251 a knowledge graph that includes a plurality of nodes associated with respective assets of the plurality of assets or respective spaces of the plurality of spaces. An application of applications 230 may access the knowledge graph in EOM 250 and determine a respective initial ranking value for each node of the plurality of nodes. The application may determine a count of outgoing links for each node of the plurality of nodes and perform a node ranking based on the initial ranking values and based on the counts of outgoing links to determine a respective updated rank for each node of the plurality of nodes. The application may then determine a respective criticality measure for each node of the plurality of nodes based on the respective updated rank.

Figure 4:
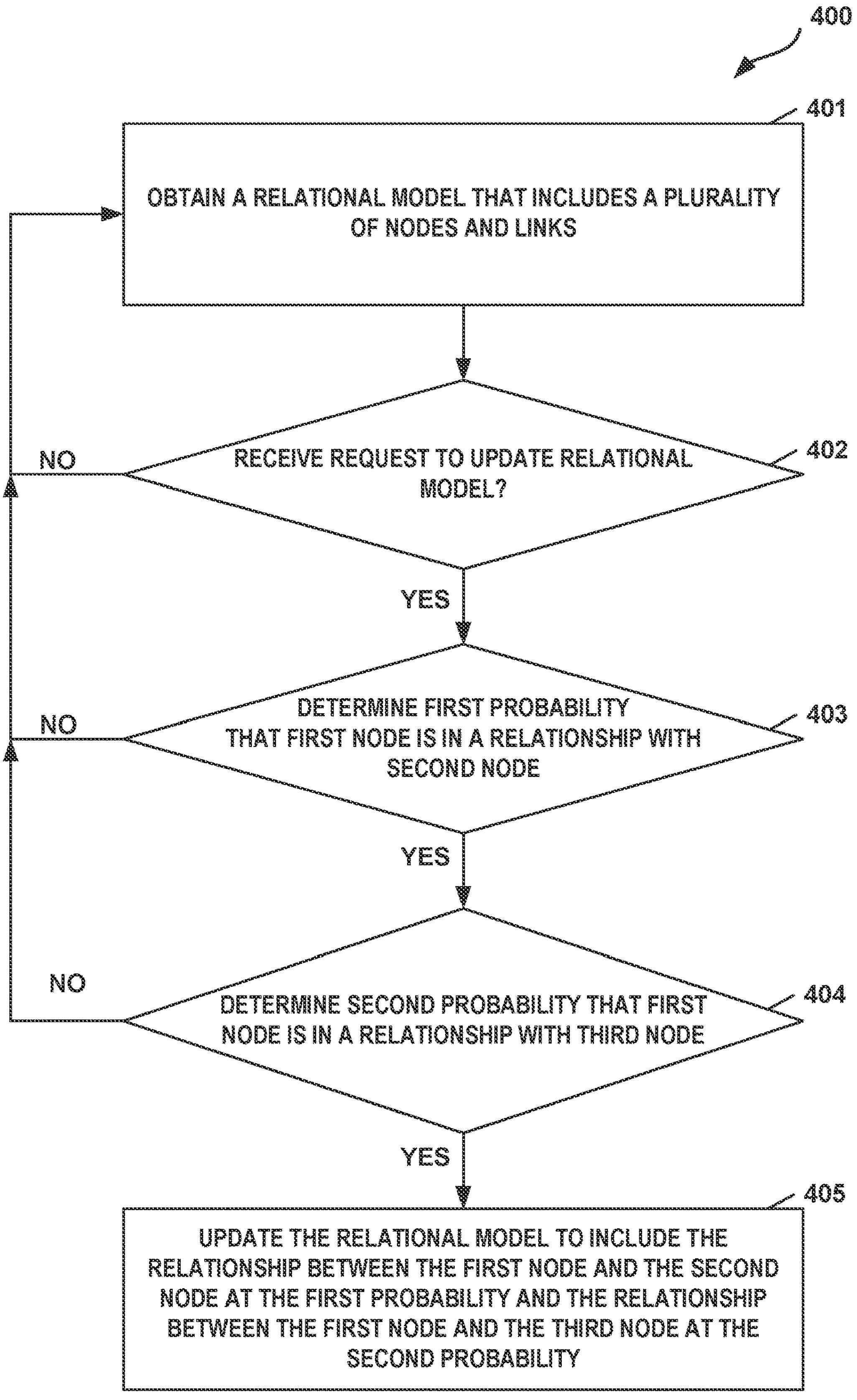
FIG. 4 depicts a flowchart illustrating a process for obtaining and updating a relational model to define an extensible object model, in accordance with the techniques of the present disclosure.

FIG. 4 depicts a flowchart illustrating a process 400 of updating a relational model (e.g., knowledge graph 251, property graph) so as to define an extensible object model of nodes across a network or an enterprise, according to one example. Process 400 will be described with respect to IoT platform 125, but it should be understood that other computing systems may also be configured to perform process 400. IoT platform 125 obtains a relational model (401). The relational model includes a plurality of nodes (e.g., a logical representation of one or more attributes of a physical device, a node's current state, and one or more calculations that may be performed using the node's data as well as other nodes' data) and a plurality of connectors, each of the connectors of the plurality of connectors connecting one or more nodes of the plurality of nodes, each node corresponding to an entity or space (e.g., physical entities, source entities that supply target entities, target entities that are supplied by source entities, information technology (IT) data, spaces in which entities are stored or may be transported to or from, etc.) and each connector corresponding to a relationship between a first node and a second node. For example, in a heating, ventilation, and air conditioning (HVAC) system, a relationship between a first node (e.g., air handling unit (AHU)) and a second node (e.g., zones of a building) may be that the first node supplies the second node with an entity, a material, and/or a substance, etc. (e.g., air). As another example, a chiller may supply an air handling unit with chilled water. The chilled water may be chilled to several degrees below a desired temperature of occupants in the building. Other examples of nodes in an HVAC system may be fans, dampers, coils, sensors, zone control system, and/or wall modules, etc. Other examples of relationships may be that a first node contains a second node. Implementations are not limited to the above examples.

IoT platform 125 determines whether a request is received to update the relational model (402). The request may, for example, include information corresponding to an added and/or edited first node. For instance, a new node may be added to the relational model and/or a previously defined node may be edited and/or updated.

If a request is received to update the relational model (402, yes), then IoT platform 125 determines a first probability that the first node is in a relationship with a second node (403). For example, if the first node is an AHU and the second node is a fan, then a probability that the AHU contains a fan may be determined. The probabilities may be provided by a user and/or may be derived using an algorithm. The algorithm may use building semantics to derive relationships among devices. For example, a building management system (BMS) may produce different types of event data (e.g., alarm data). The event data (e.g., alarm data) may be used to determine the probable relationships between two devices. The algorithm may list all possible relationships between devices by searching a group of records (e.g., alarm records) within a given time window. In that time window, the algorithm may select different events (e.g., alarm types) and identify the devices that generated the event (e.g., alarm) in that time window. The algorithm may reference a template of relationships to determine if any two devices in that time window could potentially be involved in a relationship. A combination of source device, target device and relationship type may be saved in a list. As the algorithm traverses through a list of records (e.g., alarm records), the same combinations may repeat several times. The frequency of occurrence of the combination of source device, target device, and/or relationship type may also be recorded. Thus, the algorithm has obtained a list of probable relationships along with the frequency. The algorithm may determine a probability of every relationship. As described above, relationships may be represented as incoming and/or outgoing links.

If the first probability is determined (403, yes), then IoT platform 125 determines a second probability that the first node is in a relationship with a third node (404). For example, if the third node is a damper, then a probability that the AHU contains a damper may be determined.

If the second probability is determined (404, yes), then IoT platform 125 updates the relational model to include the relationship between the first node and the second node at the first probability and the relationship between the first node and the third node at the second probability (405). To build the relational model (e.g., knowledge graph 251), IoT platform 125 may determine probabilities for every node and every relationship between nodes in the relational model. While the above examples have been described with respect to a first and second probability, it should be understood that any number of probabilities may be determined.

Additionally, as part of performing process 400, IoT platform 125 may provide a graphical user interface including visual representations of the nodes and the connectors of a relational model, and receive and process requests to update the relational model based on user inputs to the graphical user interface. An example process may further include responding to a query about a node. For example, a request may be made, e.g., by a user, to provide a list of all the chillers on a west side of a building and their efficiency over a certain time period (e.g., a weekday). Further, if an action is performed on a first node (e.g., a chiller temperature adjusted), each other node in the relational model may be adjusted to account for the action performed on the first node. In some cases, the visual representations between nodes and connectors, as well as the queries received and the information generated about the nodes and connectors may be a function of the probabilities computed regarding the relationships between nodes of the network. The probabilities may be calculated as a function of occurrences between nodes of the network with each other, and types of data transmitted between nodes of the network, as will be described in more detail below.

Figure 5:
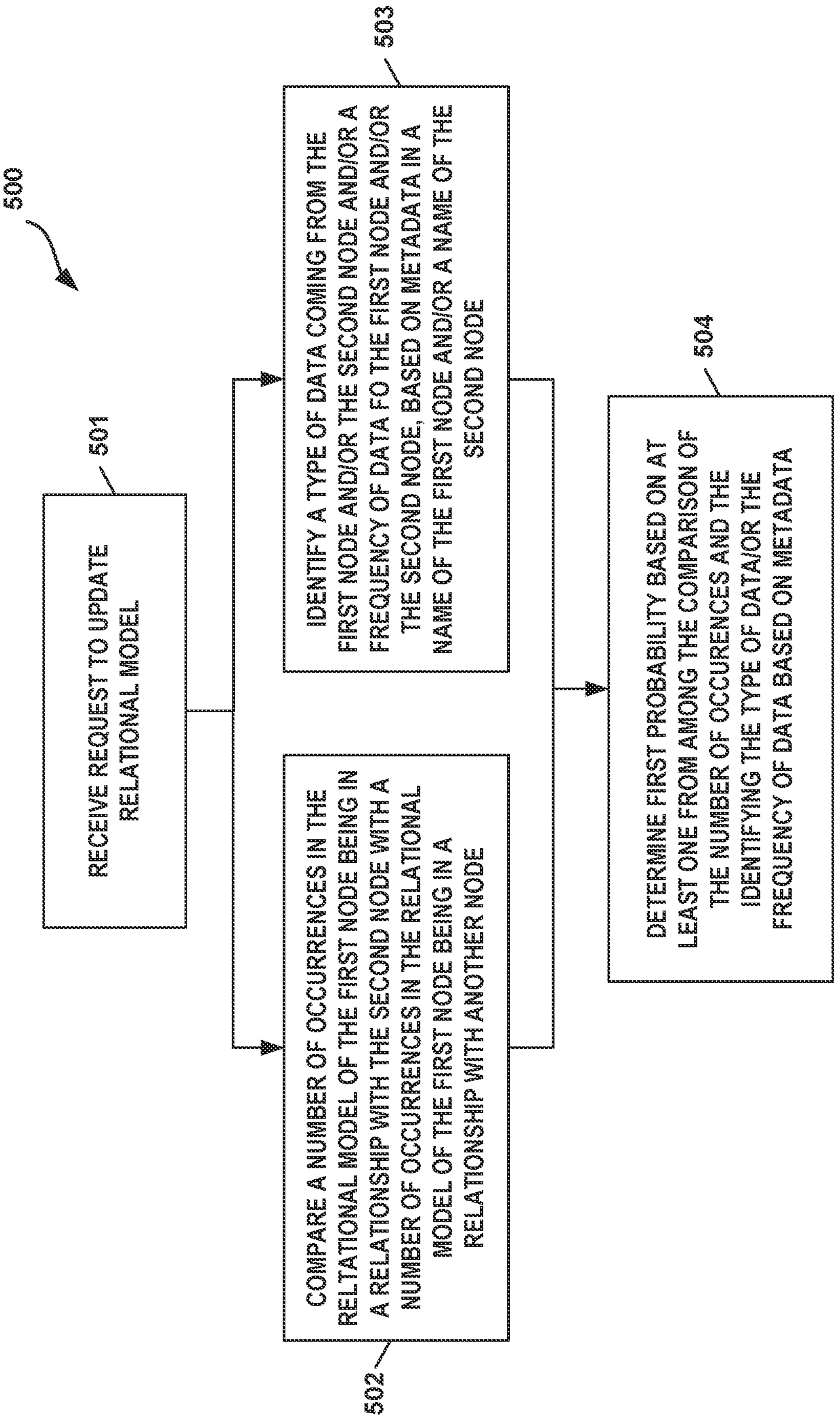
FIG. 5 depicts a flowchart illustrating a process for determining a first probability between nodes of an EOM, in accordance with the techniques of the present disclosure.

FIG. 5 depicts a process 500 for determining such probabilities based on occurrences and data types, for example, upon receiving a request to update the relational model, according to one example. As with process 400 and FIG. 4, process 500 will be described with respect to IoT platform 125, but it should be understood that other computing systems may also be configured to perform process 500. IoT platform 125 receives a request to update the relational model (501). IoT platform 125 compares a number of occurrences in the relational model of the first node being in a relationship with the second node with a number of occurrences in the relational model of the first node being in a relationship with another node (502). For example, if the first node is an AHU, the second node is a fan, and a third node is a damper, the process may include determining a number of occurrences in which an AHU contains a fan, and determining a number of occurrences in which an AHU contains a damper. A probability that the AHU contains a fan and/or a damper may be based on a comparison of the numbers of occurrences.

IoT platform 125 identifies a type of data coming from the first node and/or the second node (503). For example, a numerical range of the data may provide information about a first node and/or a second node. For example, if the data is in a range of 50-100, it may be determined that the node is a thermostat. If the data is in a range of 2000-5000, it may be determined that the node is a motor. As another example, a frequency of data may provide information about the first node and/or the second node. For example, if the data identifies that an event occurs during working hours, the node may be determined to be an occupant sensor. If the data identifies that an event occurs once or twice a day, the node may be determined to be a light switch. As another example, metadata in a name of the first node and/or a name of the second node may provide information about a first node and/or a second node. For example, if metadata refers to "XYZpump," then the process may include determining the node to be a pump. As another example, if metadata refers to "ABCchiller," then the process may include determining the node to be a chiller.

IoT platform 125 determines the first probability based on at least one from among the comparison of the number of occurrences and the identifying the type of data and/or the frequency of data based on metadata (504). For example, a probability that a first node is in a relationship with a second node and/or a third node may be determined based on comparing the number of occurrences between the nodes and/or identifying a type of data and/or frequency of data using the metadata.

Figure 6:
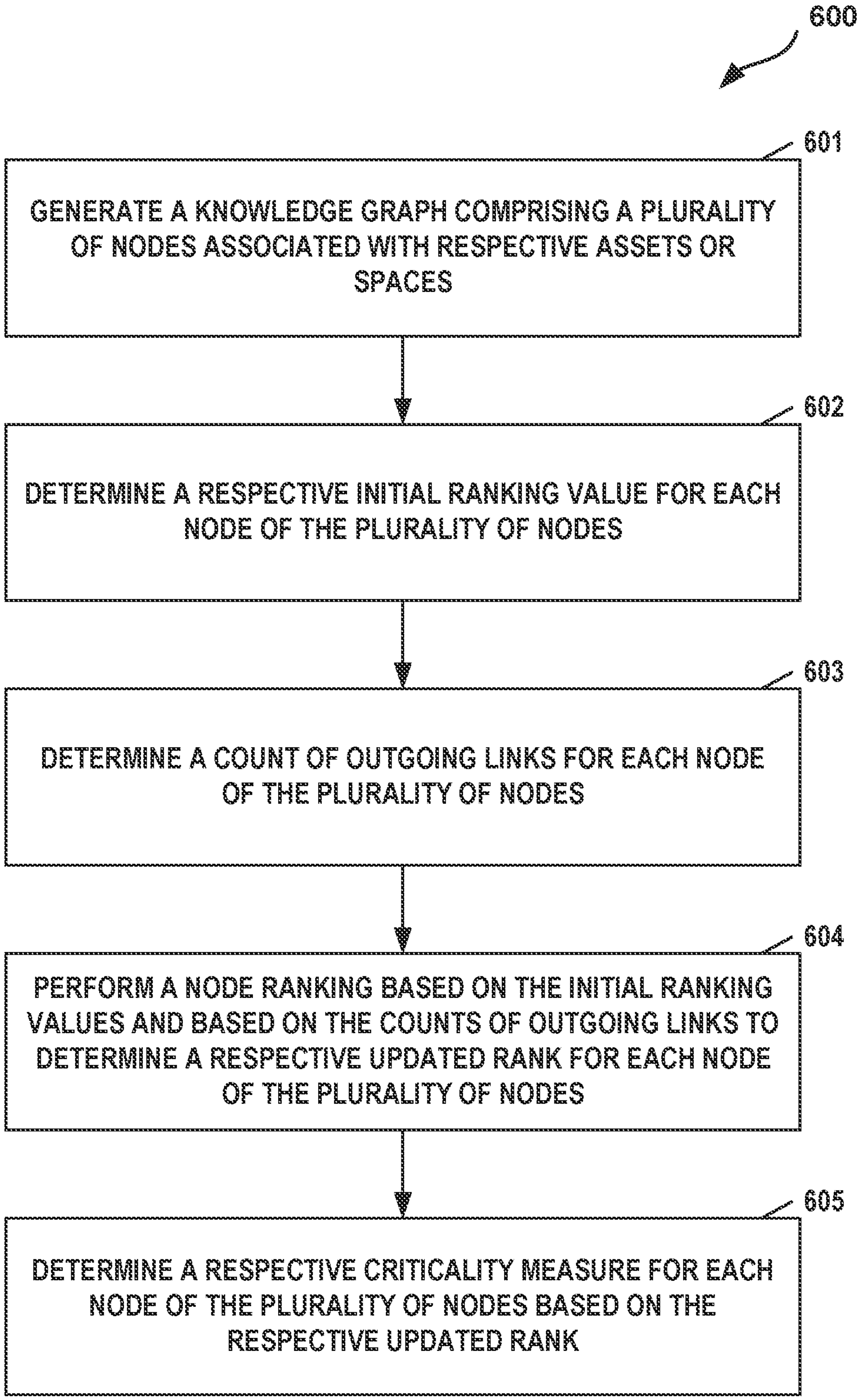
FIG. 6 depicts a process for determining the relative criticality of an asset of a plurality of assets, in accordance with the techniques of the present disclosure.

FIG. 6 depicts a process 600 for determining the relative criticality of an asset of a plurality of assets. Process 600 may be used in conjunction with monitoring the plurality of assets and an associated plurality of spaces. Process 600 will be described with respect to IoT platform 125, but it should be understood that other computing systems may also be configured to perform process 600. In performing process 600, IoT platform 125 generates a knowledge graph that includes a plurality of nodes (601). Each node of the plurality of nodes is associated with either a respective asset of the plurality of assets or a respective space of the plurality of spaces. As described in more detail above, the knowledge graph describes the plurality of assets and the plurality of spaces as well as the interrelations between the assets and the spaces. FIGS. 4 and 5 provide some examples of how IoT platform 125 may generate the knowledge graph; however, other techniques for generating knowledge graphs may also be used in conjunction with the techniques of FIG. 6.

IoT platform 125 determines a respective initial ranking value for each node of the plurality of nodes (602). IoT platform 125 may determine the respective initial ranking value based on any number of factors. For example, IoT platform 125 may determine the respective initial ranking value for a node corresponding to an asset by querying a user for, or otherwise obtaining, values indicative of a replacement cost of the asset, a maintenance cost for the asset, an amount of danger associated with asset failure, or some other such indicator of criticality. In this context, the ranking values are intended to be indicative of a relative rank. That is, the relative ranking of two assets may be determined based on the respective ranking values of the two assets. The ranking values are not necessarily intended to be indicative of an ordinal rank for a particular asset. IoT platform 125 may assign a respective initial ranking value of magnitude 1 to each node associated with a respective space of the plurality of spaces. Thus, the ranking value of nodes associated with entities, but connected with nodes associated with spaces, may be eventually weighted by the initial ranking value assigned to spaces. In this way, the influence of certain spaces on the criticality of nodes can be accounted for while determining the ranking value for the nodes connected to such spaces. In other examples, instead of magnitude 1, some other initial value may be assigned to each node associated with a respective space of the plurality of spaces.

IoT platform 125 determines a count of outgoing links for each node of the plurality of nodes (603). To determine the count of outgoing links for a particular node of the plurality of nodes, IoT platform 125 may be configured to determine a number of other nodes connected downstream of the particular node. IoT platform 125 may identify the outgoing links from the relationships defined by the knowledge graph. As discussed above, those relationships may include incoming links, outgoing links, and other such relationships. The count of outgoing links represents a number of other nodes to which the particular node delivers one or more of data, material, power, or the like. Similarly, a count of incoming links represents a number of other nodes from which the particular node receives one or more of data, material, power, or the like.

IoT platform 125 performs a node ranking based on the initial ranking values and based on the counts of outgoing links to determine a respective updated ranking value for each node of the plurality of nodes (604). IoT platform 125 may, for example, perform the node ranking by determining a respective interim ranking value for each node $T_i$ of the plurality of nodes according to equation (1):

$$NR(T_i) = (1 - d) + d\left(\frac{NR(T_1)}{C(T_1)} + \ldots \frac{NR(T_n)}{C(T_n)}\right). \tag{1}$$

$NR(T_i)$ represents the interim ranking value of the node $T_i$. The variable "d" represents a damping factor from 0 to 1, which may prevent situations where nodes do not have any links or have links to themselves or have circular links. (1−d) is the probability that the asset node is critical by itself without any relationships. $NR(T_n)$ is a previous ranking value of a node $T_n$ linked to the node $T_i$, and. $C(T_n)$ is a count of outgoing links from the node $T_n$. As can be seen by equation 1, the interim ranking of node $T_i$ is influence by multiple factors, including the number of nodes from which node $T_i$ has incoming links, as well as the rankings of those nodes and the number of outgoing links those nodes have.

IoT platform 125 may perform the node ranking by iteratively determining a plurality of successive interim ranks until convergence. IoT platform 125 may perform multiples passes of the node ranking until the ranking values stop changing or until the changes in the ranking values sufficiently small from pass to pass. IoT platform 125 may, additionally or alternatively, perform the node franking for a predetermined number of iterations. For example, IoT platform 125 may perform the node ranking for N passes, with N being a predetermined integer value.

Figure 7:
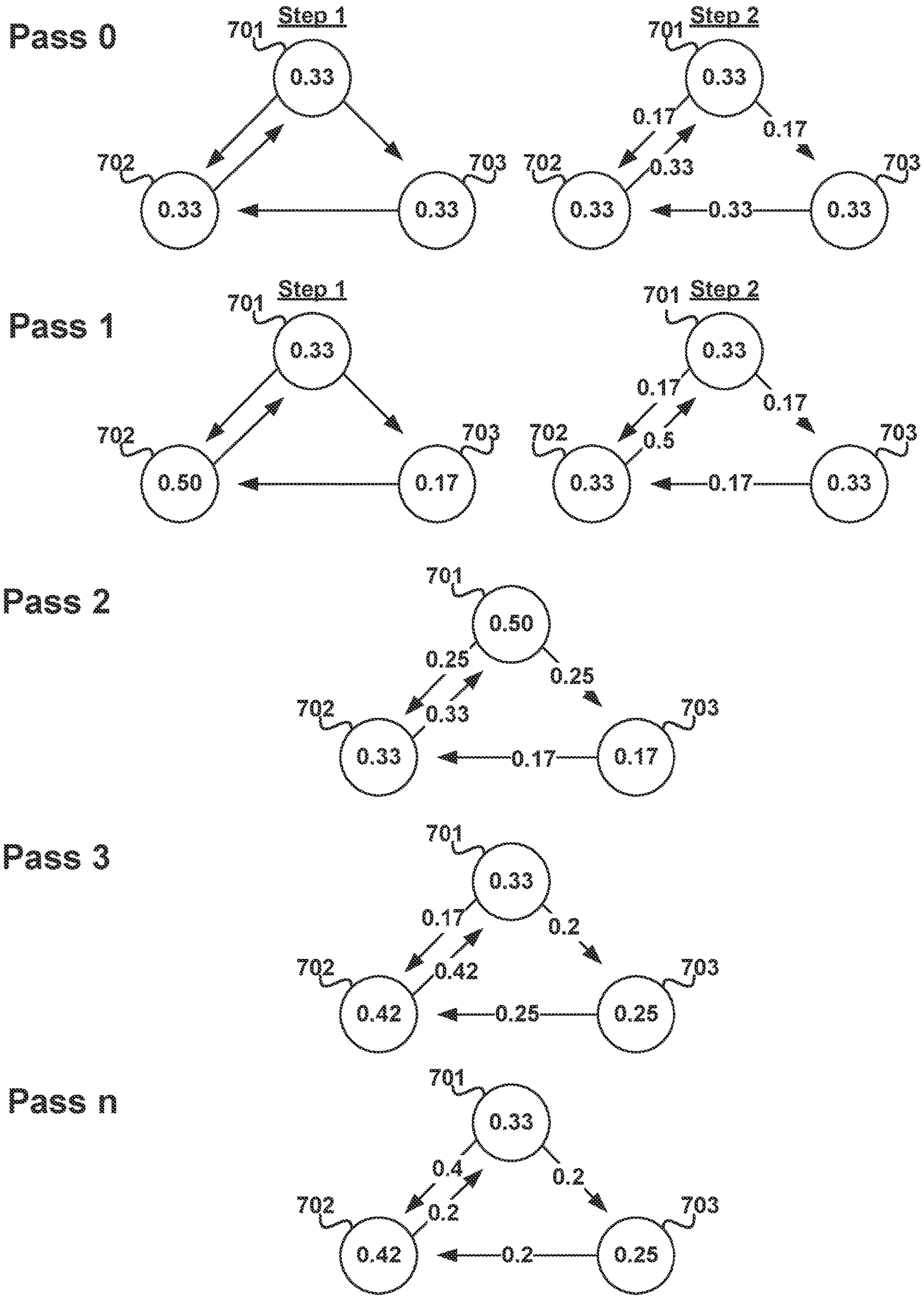
FIG. 7 shows an example of a node ranking process being performed for three nodes, in accordance with the techniques of the present disclosure.

FIG. 7 shows an example of how the node ranking algorithm may be performed for three nodes, node 701, 702, and 703. At step 1 for pass 0, IoT platform 125 assigns an initial node value based on the total number of nodes (n), which sets the initial value of 1/n generally or ⅓ for the specific example of FIG. 7. At step 2 of pass 0, IoT platform 125 determines a link value, which corresponds to the node value divided by a number of outgoing links. Thus, in the example of FIG. 7, node 701 has two outgoing links, meaning each outgoing link of node 701 has a link value of 0.17. In contrast, nodes 702 and 703 have one outgoing link each, and thus those outgoing links have values of 0.33. At step 1 of pass 1, new node values are determined as the sum of prior incoming link values. Thus at step 1, the new node value of 702 is determined to be 0.50, due to an incoming link value of 0.17 from node 701 and an incoming link value of 0.33 from node 703. Step 2 of pass 1, is performed in a similar manner to step 2 of pass 0, with IoT platform 125 determining new link values based on the new node values determined at step 1. This process repeats iteratively until convergence, i.e., subsequent passes produce little or no change in the node values, or until a threshold number of passes have been performed.

Returning to process 600, IoT platform 125 determines a respective criticality measure for each node of the plurality of nodes based on the respective updated ranking value (605). The criticality measure may, for example, be the updated ranking value itself or may be some other metric determined based on the updated ranking value. The measure of criticality may, for instance, be the ordinal ranking of a particular asset within the plurality of assets or some other such metric such as a tranche (e.g., top 10%, top 25%) to which the asset belongs within the plurality of assets.

IoT platform 125 may compare the respective criticality measure with a predetermined criticality threshold and generate any variety of different output signals based on the comparison. The output signals may identify one or both of an asset deemed to be critical and the criticality measure for that asset. Generally speaking, IoT platform 125 may generate a first type of output for assets that have criticality measures above the criticality threshold and generate a second type of output for assets that have a criticality measure below the threshold. In some implementations, multiple thresholds may be used to define a plurality of ranges corresponding to a plurality of output types.

As a more specific example, when an asset begins to exhibit characteristics indicating that the asset is near failure, IoT platform 125 may add the asset to a monthly maintenance report that gets sent to a user of IoT platform 125 if the asset has a criticality measure below the predetermined criticality threshold. If, however, the asset has a criticality measure above the predetermined criticality threshold, then IoT platform 125 may send an immediate maintenance notice to the user. If an asset is part of a line, for example, a production line, a packaging line, a shipment fulfilment line, or some other line, then IoT platform 125 may send a notice indicating the line to which the asset belongs. As another more specific example, when presenting visualizations of the assets and spaces, IoT platform 125 may customize the visualizations by presenting assets with criticality measures above the predetermined criticality threshold with colors, markings, annotations, or other such indicators that identify those assets as being relatively more critical.

A user may evaluate the respective criticality measure for each asset, and flag assets for further monitoring. For example, if IoT platform 125 assigns a relatively high criticality measure to an asset that is not typically regarded as being critical, the user may further investigate connections from that asset, and a sub-plurality of assets connected to that asset. If the user determines that some error was made in weighting a connection or contribution of an asset, or if an erroneous connection or asset was present in the knowledge graph 251, the user may reconfigure the knowledge graph and reinitiate process 600.

In some examples, in response to the criticality measures determined by IoT platform 125, a user may reconfigure one or more assets or spaces to reduce the criticality of one or more assets. For example, one or more assets may be redeployed or reconfigured such that the connection or dependency between the one or more assets and other assets is modified to reduce the criticality. Thus, process 600 may be repeated a number of times, for example, with different configurations of assets and connections, to reduce the criticality of one or more assets. In some examples, a relatively high criticality of one or more assets may persist across repeated runs of process 600 with different configurations of the knowledge graph 251. In such a case, assets having a persistently high criticality may be flagged for elevated maintenance, narrower control tolerances, or assigned a greater number of resources to reduce or avoid breakdown of such assets.

Figure 8:
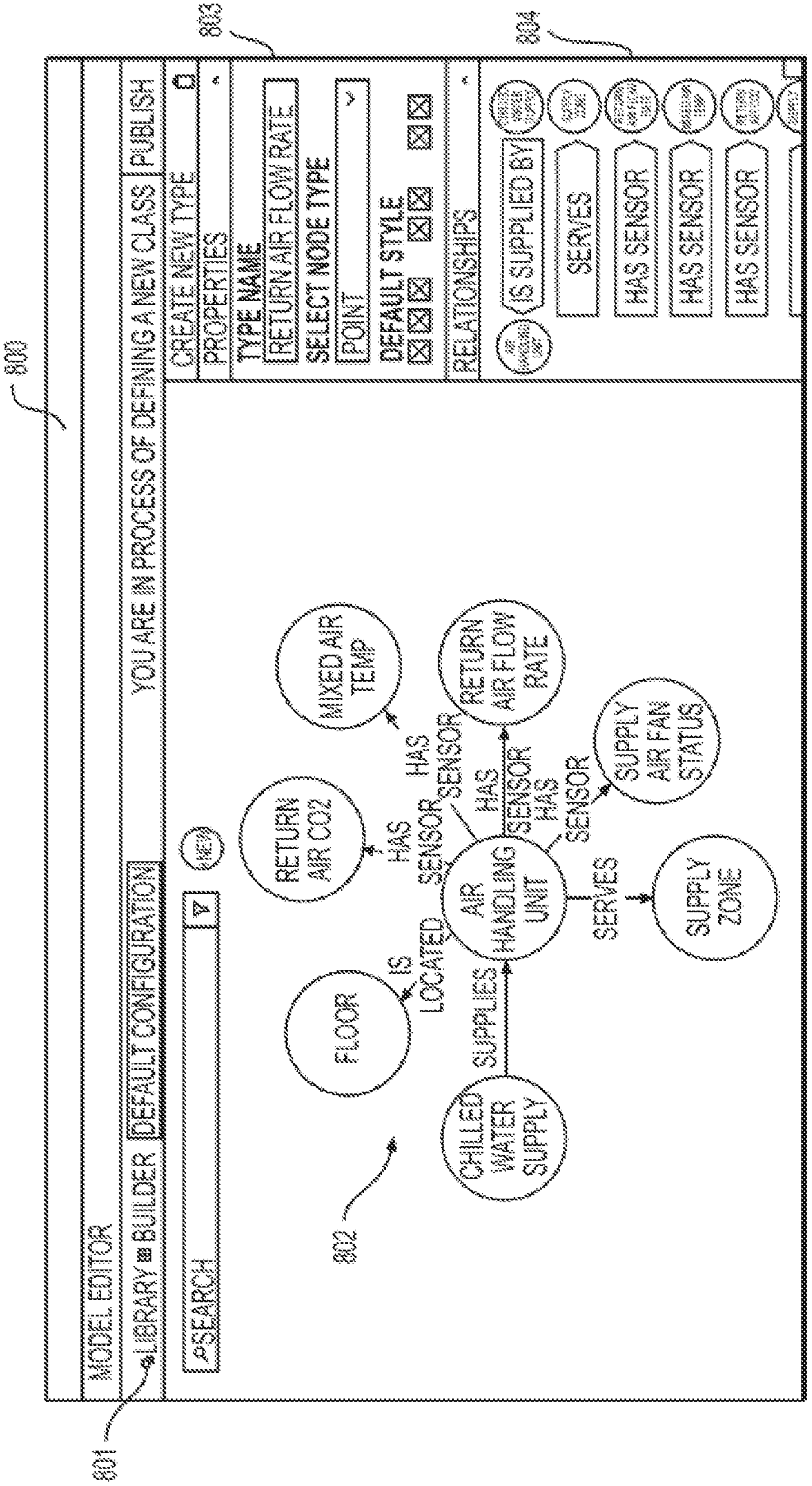
FIG. 8 depicts a diagram of a first mode for defining and editing nodes and relationships of the relational model, in accordance with the techniques of the present disclosure.

FIG. 8 depicts a diagram 800 of a first mode of defining and editing nodes and relationships, according to one example. For example, in a library mode (e.g., icon 801), a relational model 802 may include a number of nodes and connectors for defining nodes and relationships between the nodes. For example, relational model 802 may identify that the chilled water supply may supply water to the AHU. The AHU may: (1) be located on the floor; (2) have a sensor for return air carbon dioxide; (3) have a sensor for detecting a mixed air temperature; (4) have a sensor for detecting a return air flow rate; (5) have a sensor for detecting a supply air fan status; and/or (6) serve a supply zone. Graphical user interface (GUI) area 803 may be used to define and edit nodes and/or node types. For example, the type name may be entered by a user and a node type may be selected from a drop down menu. In GUI area 804, the relationships for each node may be defined and/or edited. For example, the AHU may be edited to include the relationships illustrated in relational model 802. Additionally, for each node and each relationship, a user may input a probability that a node is in a relationship with other nodes. The GUI is dynamic in nature, and the interface is adaptable to any type of data.

Figure 9:
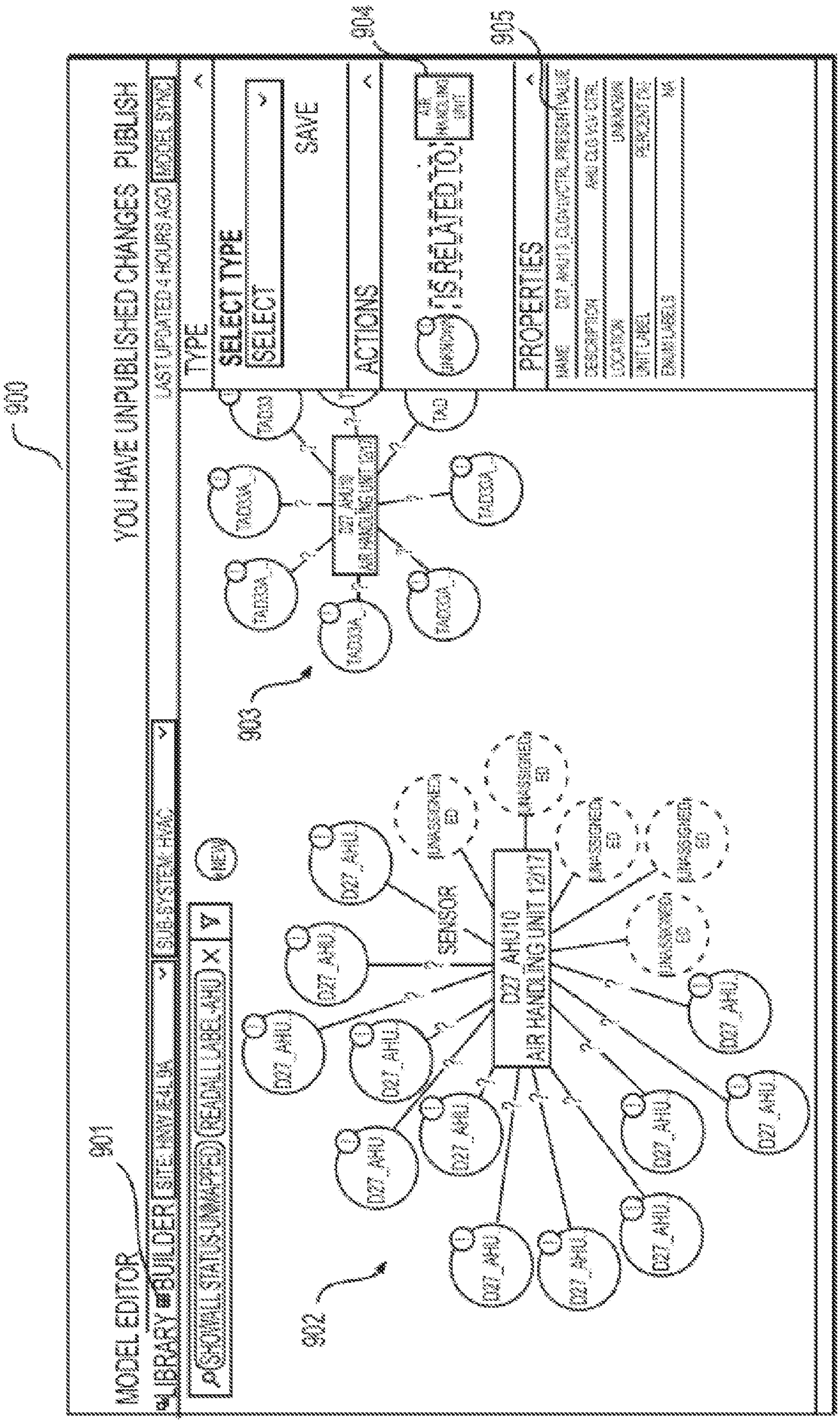
FIG. 9 depicts a diagram of a second mode of defining and editing nodes and relationships of the relational model, in which multiple groups of nodes and links may be edited at a time, in accordance with the techniques of the present disclosure.

FIG. 9 depicts a diagram 900 of a second mode of defining nodes and relationships, according to one example. For example, in a builder mode (e.g., icon 901), multiple groups of nodes and connectors may be edited at a time. For example, group 902 may define a first set of air handling units that are connected to each other. Group 903 may define a second set of air handling units that are connected to each other. GUI area 904 may be used to define relationships between nodes, and GUI area 905 may be used to define properties for each group node and/or group of nodes. Additionally, for each group node and each relationship, a user may input a probability that a group of nodes is in a relationship with another group of nodes.

Figure 10:
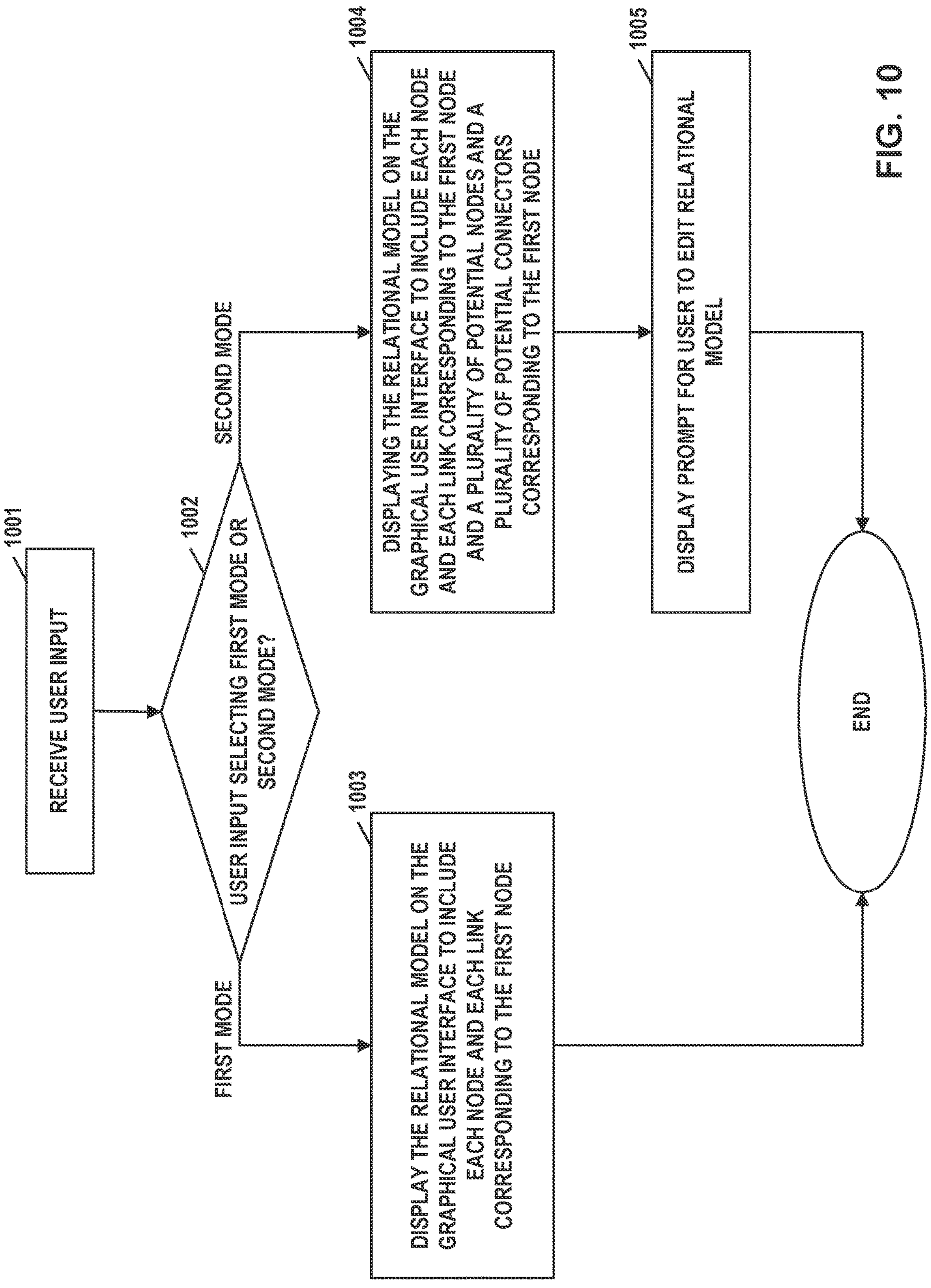
FIG. 10 depicts a flowchart illustrating a process of switching between a first mode and a second mode of a relational model editor based on user inputs, in accordance with the techniques of the present disclosure.

FIG. 10 depicts a process 1000 for providing a first mode and a second mode, according to one example. The first mode may, for example, be a library mode 800 and the second mode may be a builder mode 900. Process 1000 will be described with respect to IoT platform 125, but it should be understood that other computing systems may also be configured to perform process 1000. IoT platform 125 receives a user input on a graphical user interface to select between a first mode and a second mode, e.g., library mode 800 vs. builder mode 900 (1001). In response to the user input selecting the first mode (1002, first mode), IoT platform 125 displays the relational model on the graphical user interface to include each node and each connector corresponding to a first node (1003). As explained above, the manner in which IoT platform 125 displays the various nodes of the relational model may be determined, at least in part, on a measure of criticality for the modes, with more critical nodes being identified in some manner.

In response to the user input selecting the second mode (1002, second mode), IoT platform displays the relational model on the graphical user interface to include each node and each connector corresponding to the first node, and a plurality of potential nodes and a plurality of potential connectors corresponding to the first node (1004) and displays a prompt for a user to edit the relational model (1005).

Additionally, a user may edit or add a probability for each relationship of each node in the relational model.

Figure 11:
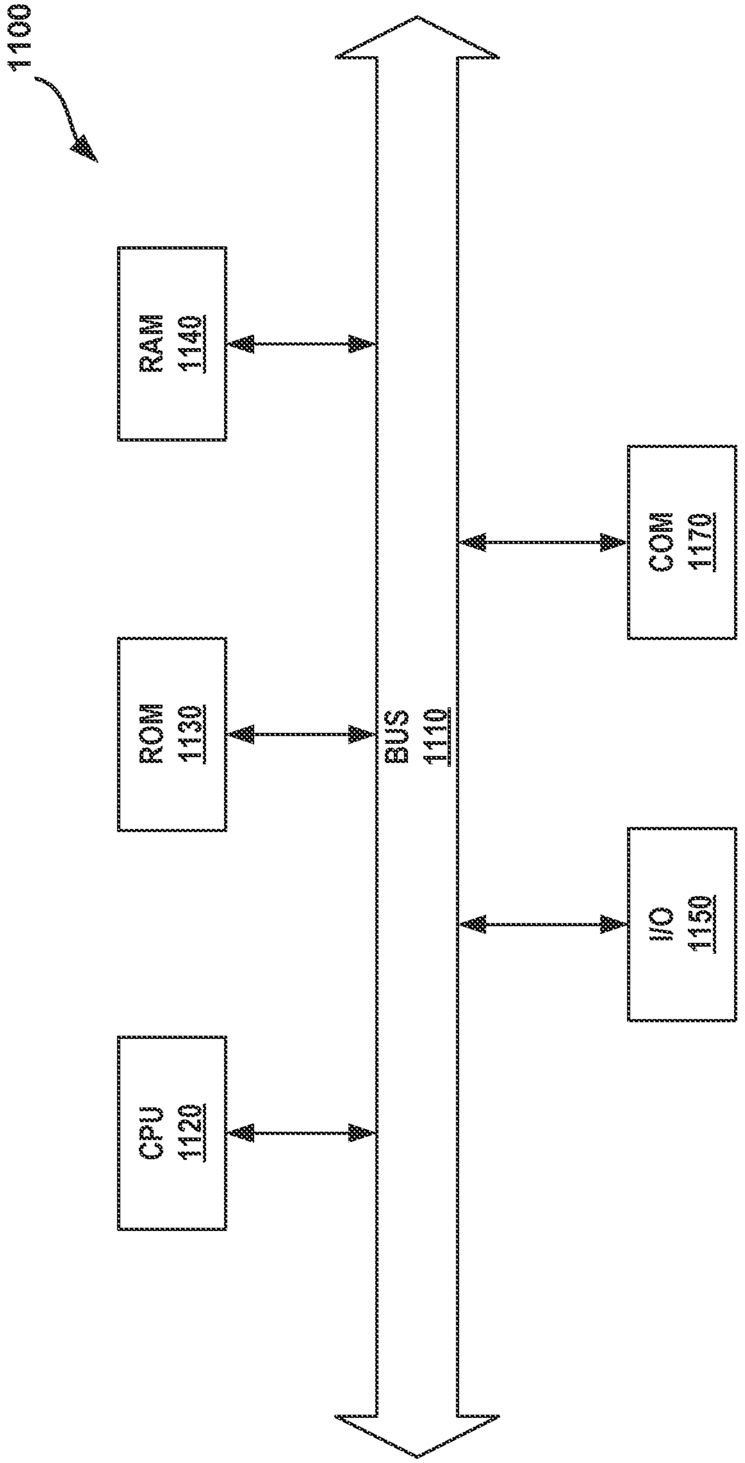
FIG. 11 depicts an example system that may execute techniques presented herein.

FIG. 11 depicts an example system 1100 that may execute techniques presented herein. FIG. 11 is a simplified functional block diagram of a computer that may be configured to execute techniques described herein, according to examples of the present disclosure. Specifically, the computer (or "platform" as it may not be a single physical computer infrastructure) may include a data communication interface 1160 for packet data communication. The platform also may include a central processing unit ("CPU") 1120, in the form of one or more processors, for executing program instructions. The platform may include an internal communication bus 1110, and the platform also may include a program storage and/or a data storage for various data files to be processed and/or communicated by the platform such as ROM 1130 and RAM 1140, although the system 1100 may receive programming and data via network communications. The system 1100 also may include input and output ports 1150 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

The following numbered examples illustrate various aspects of the systems and techniques described above.

Example 1. A system for monitoring a plurality of assets associated with a plurality of spaces, the system comprising: a memory; and one or more processors coupled to the memory, implemented in circuitry, and configured to: generate a knowledge graph comprising a plurality of nodes, each node of the plurality of nodes being associated with (i) a respective asset of the plurality of assets or (ii) a respective space of the plurality of spaces; determine a respective initial ranking value for each node of the plurality of nodes; determine a count of outgoing links for each node of the plurality of nodes; perform a node ranking based on the initial ranking values and based on the counts of outgoing links to determine a respective updated ranking value for each node of the plurality of nodes; determine a respective criticality measure for each node of the plurality of nodes based on the respective updated ranking value; compare the respective criticality measure with a predetermined criticality threshold; and generate, in response to determining that the respective criticality measure is greater than the predetermined criticality threshold, a signal indicative of the respective asset associated with the respective criticality measure.

Example 2. The system of example 1, wherein to determine the count of outgoing links for a particular node of the plurality of nodes, the one or more processors are further configured to determine a number of other nodes to which the particular node delivers one or more of data, a material, or power.

Example 3. The system of example 1 or 2, wherein to determine the count of outgoing links for a particular node of the plurality of nodes, the one or more processors are further configured to determine a number of other nodes connected downstream of the particular node.

Example 4. The system of any of examples 1-3, wherein to determine the respective initial ranking value for each node of the plurality of nodes, the one or more processors are configured to determine the respective initial ranking value based on a respective installation cost and a respective maintenance cost for each node associated with a respective asset of the plurality of assets.

Example 5. The system of any of examples 1-4, wherein to determine the respective initial ranking value for each node of the plurality of nodes, the one or more processors are further configured to assign a respective initial ranking value of magnitude 1 to each node associated with a respective space of the plurality of spaces.

Example 6. The system of any of examples 1-5, wherein to perform the node ranking, the one or more processors are configured to determine a respective interim ranking value for each node $T_i$ of the plurality of nodes according to:

$$NR(T_i) = (1 - d) + d\left(\frac{NR(T_1)}{C(T_1)} + \ldots \frac{NR(T_n)}{C(T_n)}\right),$$

wherein $NR(T_i)$ is the interim ranking value of the node $T_i$ and $T_1$ to $T_n$ correspond to nodes from which the node $T_i$ has incoming links, d is a damping factor from 0 to 1, $NR(T_n)$ is a previous rank of a node $T_n$ linked to the node $T_i$, and $C(T_n)$ is a count of outgoing links from the node $T_n$.

Example 7. The system of example 6, wherein the one or more processors are configured to perform the node ranking by iteratively determining a plurality of successive interim ranking values until convergence.

Example 8. The system of example 6, wherein the one or more processors are configured to perform the node ranking by iteratively determining a plurality of successive interim ranking values for a predetermined number of iterations.

Example 9. The system of any of examples 1-8, wherein the one or more processors are further configured to determine the count of outgoing links for each node of the plurality of nodes based on the knowledge graph.

Example 10. The system of any of examples 1-9, wherein the signal comprises a first signal, and the one or more processors are further configured to generate a second signal indicative of the respective criticality measure.

Example 11. The system of any of examples 1-10, wherein the one or more processors are further configured to store an extensible object model comprising the knowledge graph in the memory.

Example 12. The system of any of examples 1-11, wherein the knowledge graph comprises a semantic object model.

Example 13. The system of any of examples 1-12, further comprising: one or more cloud-based computing devices comprising the memory and the one or more processors.

Example 14. A method for ranking a plurality of assets associated with a plurality of spaces, the method comprising: generating, by processing circuitry, a knowledge graph comprising a plurality of nodes, each node of the plurality of nodes being associated with (i) a respective asset of the plurality of assets or (ii) a respective space of the plurality of spaces; determining, by the processing circuitry, a respective initial ranking value for each node of the plurality of nodes; determining, by the processing circuitry, a count of outgoing links for each node of the plurality of nodes; performing, by the processing circuitry, a node ranking based on the initial ranking values and based on the counts of outgoing links to determine a respective updated ranking value for each node of the plurality of nodes; determining, by the processing circuitry, a respective criticality measure for each node of the plurality of nodes based on the respective updated ranking value; comparing, by the processing circuitry, the respective criticality measure with a predetermined criticality threshold; and generating, by the processing circuitry and in response to determining that the respective criticality measure is greater than the predetermined criticality threshold, a signal indicative of the respective asset associated with the respective criticality measure.

Example 15. The method of example 14, wherein determining the count of outgoing links for a particular node of the plurality of nodes comprises determining a number of other nodes to which the particular node delivers one or more of data, a material, or power.

Example 16. The method of any of example 14 or 15, wherein determining the count of outgoing links for a particular node of the plurality of nodes comprises determining a number of other nodes connected downstream of the particular node.

Example 17. The method of any of examples 14-16, wherein determining the respective initial ranking value comprises determining the respective initial ranking value based on a respective installation cost and a respective maintenance cost for each node associated with a respective asset of the plurality of assets.

Example 18. The method of any of examples 14-17, wherein determining the respective initial ranking value comprises assigning a respective initial ranking value of magnitude 1 to each node associated with a respective space of the plurality of spaces.

Example 19. The method of any of examples 14-18, wherein performing the node ranking comprises performing the node ranking by determining a respective interim ranking value for each node $T_i$ of the plurality of nodes according to:

$$NR(T_i) = (1-d) + d\left(\frac{NR(T_1)}{C(T_1)} + \ldots \frac{NR(T_n)}{C(T_n)}\right),$$

wherein $NR(T_i)$ is the interim ranking value of the node $T_i$ and $T_1$ to $T_n$ correspond to nodes from which the node $T_i$ has incoming links, d is a damping factor from 0 to 1, $NR(T_n)$ is a previous rank of a node $T_n$ linked to the node $T_i$, and $C(T_n)$ is a count of outgoing links from the node $T_n$.

Example 20. The method of example 19, wherein performing the node ranking comprises iteratively determining a plurality of successive interim ranking values.

The general discussion of the present disclosure provides a brief, general description of a suitable computing environment in which the present disclosure may be implemented. Any of the disclosed systems, processes, and/or graphical user interfaces may be executed by or implemented by a computing system consistent with or similar to that depicted and/or explained in the present disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure also may be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

One or more includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. Except where otherwise indicated, these terms are only used to distinguish one element from another. For example, a first contact could be termed a second contact, and, similarly, a second contact could be termed a first contact, without departing from the scope of the various described examples. The first contact and the second contact are both contacts, but they are not the same contact.

The terminology used in the description of the various described examples herein is for the purpose of describing particular examples only and is not intended to be limiting. As used in the description of the various described examples and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in the present disclosure, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

The systems, apparatuses, devices, and methods disclosed herein are described in detail by way of examples and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these the apparatuses, devices, systems or methods unless specifically designated as mandatory. For case of reading and clarity, certain components, modules, or methods may be described solely in connection with a specific figure. In the present disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Throughout the present disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context.

Various examples have been described. These and other examples are within the scope of the following claims.

What is claimed is:

1. A system for monitoring a plurality of assets associated with a plurality of spaces, the system comprising:

a memory; and one or more processors coupled to the memory, implemented in circuitry, and configured to:

receive, from at least one sensor associated with at least one asset of the plurality of assets, alarm data generated by the at least one sensor in response to detection of an operational event;

generate a knowledge graph comprising: (a) a plurality of nodes, each node of the plurality of nodes being associated with (i) a respective asset of the plurality of assets or (ii) a respective space of the plurality of spaces, and (b) a plurality of relationships between nodes of the plurality of nodes, wherein generating the knowledge graph further comprises defining the relationships between nodes using the alarm data, wherein the defining is based on comparison of a number of occurrences in the alarm data of a first node being in a relationship with a second node with a number of occurrences in the alarm data of the first node being in a relationship with another node different from the second node;

determine a respective initial ranking value for each node of the plurality of nodes;

determine a count of outgoing links for each node of the plurality of nodes, wherein the outgoing links are identified from the relationships between nodes defined in the knowledge graph;

perform a node ranking based on the initial ranking values and based on the counts of outgoing links to determine a respective updated ranking value for each node of the plurality of nodes;

determine a respective criticality measure for each node of the plurality of nodes based on the respective updated ranking value;

compare the respective criticality measure with a predetermined criticality threshold; and generate, in response to determining that the respective criticality measure is greater than the predetermined criticality threshold, a signal indicative of the respective asset associated with the respective criticality measure, wherein the signal is configured to trigger at least one of a maintenance scheduling action or an alert notification for the asset.

2. The system of claim 1, wherein to determine the count of outgoing links for a particular node of the plurality of nodes, the one or more processors are further configured to determine a number of other nodes to which the particular node delivers one or more of data, a material, or power.

3. The system of claim 1, wherein to determine the count of outgoing links for a particular node of the plurality of nodes, the one or more processors are further configured to determine a number of other nodes connected downstream of the particular node.

4. The system of claim 1, wherein to determine the respective initial ranking value for each node of the plurality of nodes, the one or more processors are configured to determine the respective initial ranking value based on a respective installation cost and a respective maintenance cost for each node associated with a respective asset of the plurality of assets.

5. The system of claim 1, wherein to determine the respective initial ranking value for each node of the plurality of nodes, the one or more processors are further configured to assign a respective initial ranking value of magnitude 1 to each node associated with a respective space of the plurality of spaces.

6. The system of claim 1, wherein to perform the node ranking, the one or more processors are configured to determine a respective interim ranking value for each node $T_i$ of the plurality of nodes according to:

$$NR(T_i) = (1-d) + d\left(\frac{NR(T_1)}{C(T_1)} + \ldots \frac{NR(T_n)}{C(T_n)}\right),$$

wherein $NR(T_i)$ is the interim ranking value of the node $T_i$ and $T_1$ to $T_n$ correspond to nodes from which the node $T_i$ has incoming links, d is a damping factor from 0 to 1, $NR(T_n)$ is a previous rank of a node $T_n$ linked to the node $T_i$, and $C(T_n)$ is the count of outgoing links from the node $T_n$.

7. The system of claim 6, wherein the one or more processors are configured to perform the node ranking by iteratively determining a plurality of successive interim ranking values until convergence.

8. The system of claim 6, wherein the one or more processors are configured to perform the node ranking by iteratively determining a plurality of successive interim ranking values for a predetermined number of iterations.

9. The system of claim 1, wherein the one or more processors are further configured to determine the count of outgoing links for each node of the plurality of nodes based on the knowledge graph.

10. The system of claim 1, wherein the signal comprises a first signal, and the one or more processors are further configured to generate a second signal indicative of the respective criticality measure.

11. The system of claim 1, wherein the one or more processors are further configured to store an extensible object model comprising the knowledge graph in the memory.

12. The system of claim 1, wherein the knowledge graph comprises a semantic object model.

13. The system of claim 1, further comprising:

one or more cloud-based computing devices comprising the memory and the one or more processors.

14. A method for ranking a plurality of assets associated with a plurality of spaces, the method comprising:

receiving, by processing circuitry from at least one sensor associated with at least one asset of the plurality of assets, alarm data generated by the at least one sensor in response to detection of an operational event;

generating, by the processing circuitry, (a) a knowledge graph comprising a plurality of nodes, each node of the plurality of nodes being associated with (i) a respective asset of the plurality of assets or (ii) a respective space of the plurality of spaces, and (b) a plurality of relationships between nodes of the plurality of nodes, wherein generating the knowledge graph further comprises defining the relationships between nodes using the alarm data, wherein the defining is based on comparison of a number of occurrences in the alarm data of a first node being in a relationship with a second node with a number of occurrences in the alarm data of the first node being in a relationship with another node different from the second node;

determining, by the processing circuitry, a respective initial ranking value for each node of the plurality of nodes, wherein the outgoing links are identified from the relationships between nodes defined in the knowledge graph;

determining, by the processing circuitry, a count of outgoing links for each node of the plurality of nodes;

performing, by the processing circuitry, a node ranking based on the initial ranking values and based on the counts of outgoing links to determine a respective updated ranking value for each node of the plurality of nodes;

determining, by the processing circuitry, a respective criticality measure for each node of the plurality of nodes based on the respective updated ranking value;

comparing, by the processing circuitry, the respective criticality measure with a predetermined criticality threshold; and generating, by the processing circuitry and in response to determining that the respective criticality measure is greater than the predetermined criticality threshold, a signal indicative of the respective asset associated with the respective criticality measure, wherein the signal is configured to trigger at least one of a maintenance scheduling action or an alert notification for the asset.

15. The method of claim 14, wherein determining the count of outgoing links for a particular node of the plurality of nodes comprises determining a number of other nodes to which the particular node delivers one or more of data, a material, or power.

16. The method of claim 14, wherein determining the count of outgoing links for a particular node of the plurality of nodes comprises determining a number of other nodes connected downstream of the particular node.

17. The method of claim 14, wherein determining the respective initial ranking value comprises determining the respective initial ranking value based on a respective installation cost and a respective maintenance cost for each node associated with a respective asset of the plurality of assets.

18. The method of claim 14, wherein determining the respective initial ranking value comprises assigning a respective initial ranking value of magnitude 1 to each node associated with a respective space of the plurality of spaces.

19. The method of claim 14, wherein performing the node ranking comprises performing the node ranking by determining a respective interim ranking value for each node $T_i$ of the plurality of nodes according to:

$$NR(T_i) = (1 - d) + d\left(\frac{NR(T_1)}{C(T_1)} + \ldots \frac{NR(T_n)}{C(T_n)}\right),$$

wherein $NR(T_i)$ is the interim ranking value of the node $T_i$ and $T_1$ to $T_n$ correspond to nodes from which the node $T_i$ has incoming links, d is a damping factor from 0 to 1, $NR(T_n)$ is a previous rank of a node $T_n$ linked to the node $T_i$, and $C(T_n)$ is the count of outgoing links from the node $T_n$.

20. The method of claim 19, wherein performing the node ranking comprises iteratively determining a plurality of successive interim ranking values.

* * * * *